(12) United States Patent
Saby et al.

(10) Patent No.: US 6,839,355 B1
(45) Date of Patent: Jan. 4, 2005

(54) CABLE MODEM LINK LAYER BRIDGE

(75) Inventors: Bernard Saby, Foster City, CA (US); Harry Hvostov, San Jose, CA (US); Anthony Fung, Pleasanton, CA (US); Peter Groz, San Jose, CA (US)

(73) Assignee: STMicroelectronics, Inc., Carrollton, TX (US)

( * ) Notice: Subject to any disclaimer, the term of this patent is extended or adjusted under 35 U.S.C. 154(b) by 0 days.

(21) Appl. No.: 09/461,672

(22) Filed: Dec. 14, 1999

(51) Int. Cl.$^7$ .......................... H04L 12/56; H04L 12/66
(52) U.S. Cl. ...................... 370/401; 370/352; 370/389; 725/111
(58) Field of Search ................................ 370/401, 351, 370/352, 356, 469, 412, 389, 394; 725/111

(56) References Cited

U.S. PATENT DOCUMENTS

| | | | |
|---|---|---|---|
| 5,742,607 A | | 4/1998 | Beighe et al. .............. 370/419 |
| 5,809,252 A | * | 9/1998 | Beighe et al. .............. 709/227 |
| 6,618,386 B1 | * | 9/2003 | Liu et al. .................... 370/401 |
| 6,618,387 B1 | * | 9/2003 | Liu et al. .................... 370/401 |

FOREIGN PATENT DOCUMENTS

EP      0 915 591 A2     5/1999

OTHER PUBLICATIONS

MCNS partners, "*Data–Over–Cable Service Interface Specifications*: Radio Frequency Interface Specifications," Cable Television Laboratories, Inc.,©1997, pp. 1–195, SP–RF1–104–980724.

\* cited by examiner

*Primary Examiner*—Duc Ho
(74) *Attorney, Agent, or Firm*—Lisa K. Jorgenson; David V. Carlson

(57) ABSTRACT

A cable modem link layer bridge includes a downstream forwarding task and an upstream forwarding task. The downstream forwarding task is structured to receive a first message from a cable network and forward the first message to a customer premises equipment (CPE). The upstream forwarding task is structured to receive a second message from the CPE and forward the second message to the cable network, the upstream and downstream forwarding tasks being multitasked such that the second message is forwarded by the upstream forward task while the first message is being forwarded by the downstream forwarding task.

16 Claims, 7 Drawing Sheets

CABLE MODEM LINK LAYER BRIDGE

TECHNICAL FIELD

The present invention relates to cable modems, and in particular, to a link layer bridge of a cable modem.

BACKGROUND OF THE INVENTION

Cable operators are interested in deploying high-speed data communications systems on cable television systems. In an effort to enable the definition, design, development and deployment of data-over-cable systems on an uniform, consistent, open, non-proprietary, multi-vendor interoperable basis, the cable operators have prepared a series of interface specifications known as Data-Over-Cable Service Interface Specifications (DOCSIS). The intended service will allow transparent bi-directional transfer of Internet Protocol (IP) traffic, between the cable system of the cable operator and customer locations, over an all-coaxial or hybrid-fiber/coax (HFC) cable network.

FIG. 1 illustrates a communications system 10 envisioned by DOCSIS. The communications system 10 includes a cable modem termination system (CMTS) 12 that interfaces with a wide-area network 14, such as the Internet. The CMTS 12 is coupled by a cable network 16 to a cable modem (CM) 18, which is coupled to a customer premises equipment (CPE) 20, such as a computer, by a CM-CPE interface 22. The CMTS12 and cable modem 18 provide a cable-based communication interface between the CPE 20 and the wide-area network 14, thereby allowing a user of the CPE 20 to send data to and receive data from the wide-area network 14. The advantages of such a cable-based communication system 10 is that the cable network 16 is already in place in most locations in the United States for television systems and the cable network 16 is capable of much faster data transmission rates than current systems employing public telephone lines.

Although it specifies many basic requirements of the communication system 10, DOCSIS does not specify the details of how those requirement are implemented. For example, DOCSIS specifies (page 14) the following rules (among others) that the cable modem 18 must follow when exchanging data between the cable network 16 and the CPE 20, but does not specify the hardware and/or software to be used by the cable modem 18 to satisfy the rules.
3.1.2.3.2 Forwarding
Cable modem (CM) forwarding in both directions MUST conform to the following general 802.1d guidelines:

Link-layer frames between a given pair of end-stations MUST be delivered in order.

Link-layer frames MUST NOT be duplicated.

Stale frames (those that cannot be delivered in a timely fashion) MUST be discarded.

SUMMARY OF THE INVENTION

An embodiment of the invention is directed to a cable modem link layer bridge that includes a downstream forwarding task and an upstream forwarding task. The downstream forwarding task is structured to receive a first message from a cable network and forward the first message to a customer premises equipment (CPE). The upstream forwarding task is structured to receive a second message from the CPE and forward the second message to the cable network, the upstream and downstream forwarding tasks being multitasked such that the second message is forwarded by the upstream forward task while the first message is being forwarded by the downstream forwarding task.

Another embodiment of the invention is directed to a cable modem link layer bridge that includes a station cache and a station cache manager. The station cache includes a plurality of station entries, with each station entry being associated with a respective one of a plurality of customer premises equipment (CPE). The station entry includes a function identifier that identifies an action to be taken by the bridge in response to receiving a message intended for the associated CPE. The station cache manager structured to modify the function identifier in response to a user request.

Another embodiment of the invention is directed to cable modem that includes a host for receiving messages directed to the cable modem; a first set of memory buffers for storing messages; a media access controller (MAC); a downstream forwarding task a second set of memory buffers; and a host receive task. The MAC is structured to receive a first message from a cable network and store the first message in a first memory buffer of the first set. The downstream forwarding task is structured to determine whether the first message is directed to the host. The host receive task is structured to copy the first message into a second memory buffer of the second set, release the first memory buffer for re-use by the MAC, and pass control of the first message to the host for processing using the second memory buffer.

DETAILED DESCRIPTION OF THE ILLUSTRATED EMBODIMENTS

Figure 1:
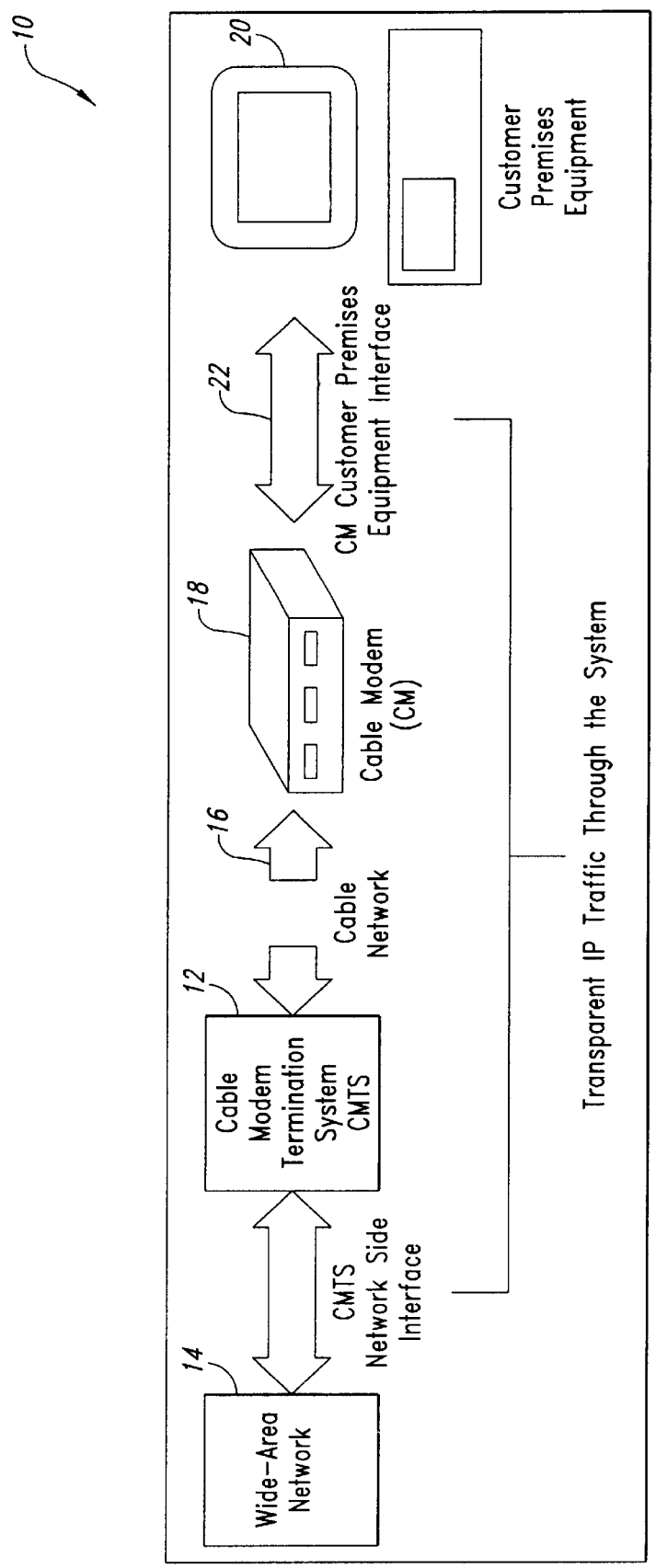
FIG. 1 is a block diagram of cable communication system employing a cable modem.
Figure 2:
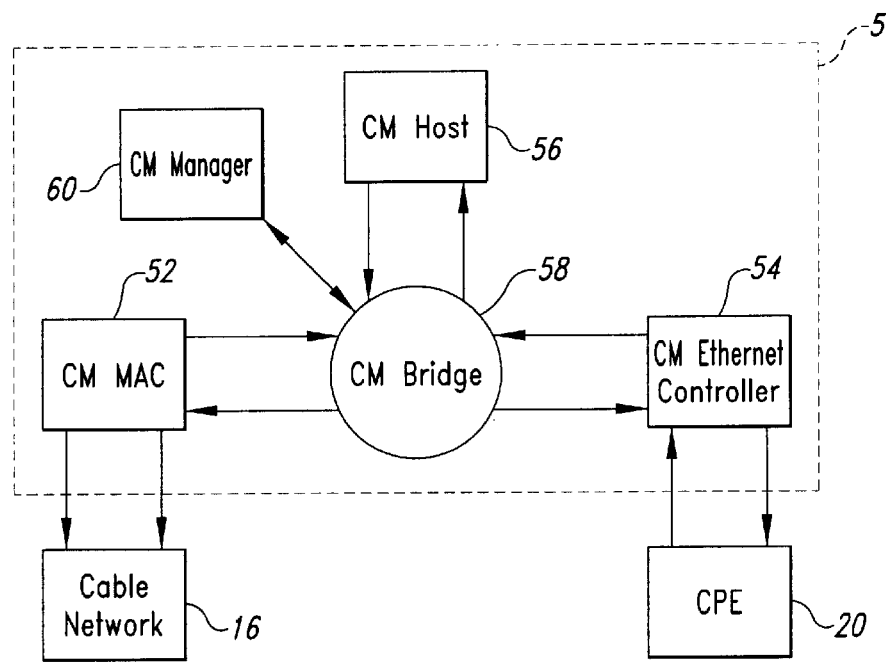
FIG. 2 is a block diagram of a cable modem including a link layer bridge according to the present invention.

FIG. 2 shows a cable modem (CM) 50 according to an embodiment of the present invention. The cable modem 50 includes a media access controller (CM MAC) 52, an Ethernet controller 54, a host 56, and a bridge 58. The CM MAC 52 is coupled to and interfaces with the cable network 16 to transfer internet protocol (IP) frames or packets between the cable modem 50 and the cable network. The Ethernet controller 54 is coupled to and interfaces with the CPE 20 to transfer IP frames between the cable modem 50 and the CPE. The Ethernet controller 54 includes an Ethernet port that can be coupled to a single CPE 20 or a set of plural CPEs. The host 56 allows the cable modem 50 to communicate with other communications devices (e.g., other cable modems, telephone line modems, etc.) without requiring the computing facilities of the attached CPE 20. The cable modem 50 also includes a CM Manager 60 that, controls the operation of the bridge 58 by setting certain configuration parameters during an initialization phase or modifying those parameters as desired. The CM MAC 52, Ethernet controller 54, host 56, and bridge 58 are implemented in one embodiment using a software-controlled microprocessor, although those skilled in the art will understand that a hardware configuration could be implemented based on the discussion herein.

The host 56 has its own unique Ethernet address which allows data frames to be received by the host. The host includes both a TCP/IP host or protocol stack that can receive and transmit IP frames and an LLC host or protocol stack that can receive and transmit LLC frames. In one embodiment, the TCP/IP host is "Fusion" from Pacific Software Inc., although other TCP/IP hosts could be employed.

1.1 Bridge Functions

The bridge 58 is the part of the cable modem 50 that transfers data traffic back and forth between the CM MAC 52 interface and the Ethernet controller 54 interface. The bridge 58 operates at the data link layer level (Layer 2): it receives Ethernet frames on one interface and retransmits the very same frame on the other interface. A software implementation is described below, although those skilled in the art will understand that the same functions could be implemented in hardware.

The cable modem 50 supports the standard Ethernet frame format (DIX), as per RFC-894, and IEEE 802.3 (with SNAP-Sub-Network Address Protocol framing), as per RFC-1042 frame formats. The IEEE 802.3 frame format is implemented for 802.2 LLC commands XID and TEST addressed to the CM host 56.

DOCSIS specifies a certain number of Ethernet MAC address-based filtering rules for downstream and upstream directions; frames that do not conform to these filtering rules must be discarded by the bridge. The most important rule is based on the "learning" principle: the bridge must not forward frames transmitted between two nodes located on the same side of the bridge, such as the traffic between the CM and the CMTS (both located on the cable side) or between two CPE's (on the Ethernet side). Such frames, therefore, are discarded.

DOCSIS also requires filtering ability based on the Network Layer protocol embedded in the forwarded Ethernet frames. Filtering on IP (and ARP) or other Layer 3 protocol (such as IPX, NetBIOS, and Appletalk) is implemented, based on the Ethernet Type field value (for DIX framing) or the SNAP Ethernet Type (for 802.3 with SNAP framing). Filtering of IEEE 802.1d BPDU (Bridge Protocol Data Unit) is also implemented.

IP protocol filters (Layer 4) are also required by DOCSIS. The IP protocol filters can be used to restrict upstream or downstream traffic based on source and destination IP addresses, transport-layer protocols (such as TCP, UDP, and ICMP), and source and destination TCP/UDP port numbers.

1.2 Downstream and Upstream Bridging Processes

Two of the main processes of the bridge 58 are the downstream bridging (from CM MAC 52 to Ethernet controller 54) and the upstream bridging (from Ethernet controller to CM MAC). In a preferred embodiment of the present invention, these processes are implemented using separate tasks that are multitasked by the bridge microprocessor 60 or by plural microprocessors. The term "task" is used herein in its known computer sense to refer to an independent processing context memory structures that allows the task to be processed independently from and simultaneously with other tasks.

1.2.1 Downstream Bridging Process

Figure 3:
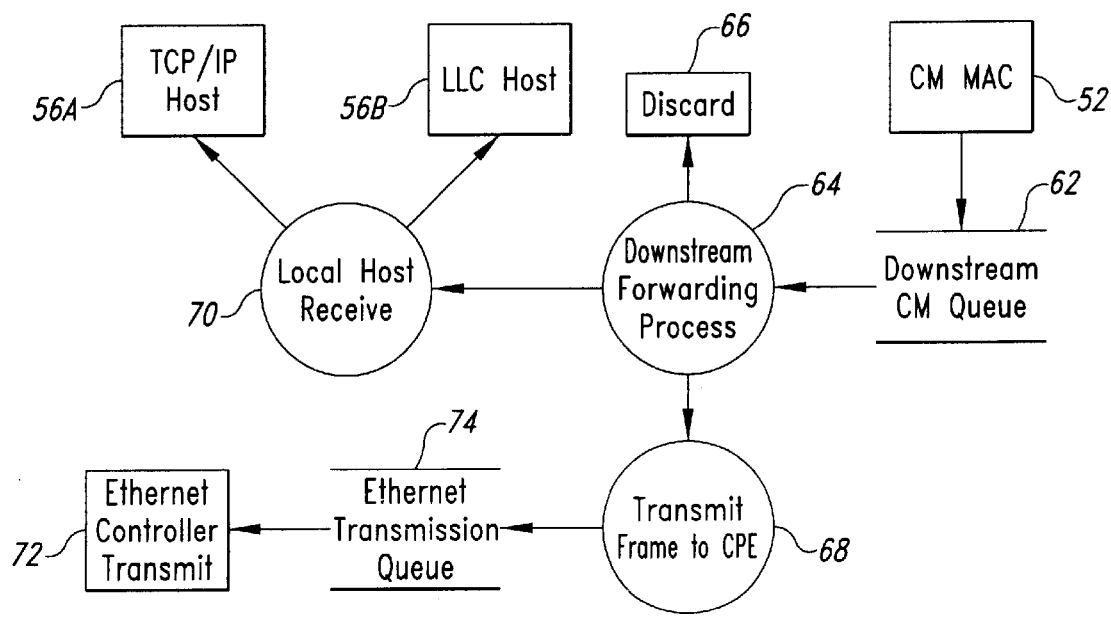
FIG. 3 is a state diagram showing a method according to an embodiment of the present invention for processing downstream message frames received from a cable network.

A downstream bridging process according to an embodiment of the present invention is shown in FIG. 3. The CM MAC 52 receives Ethernet frames from the cable network 16 and stores them in respective MAC memory buffers arranged in a downstream MAC queue 62. A downstream forward process 64 of the bridge 58 selects the next frame from the queue 62 and, based on the information in a frame header of the frame (Destination address, Source address, Type), three possible actions can follow:

1/ discard the frame (step 66), that is, release the memory buffer in which the frame was stored;

2/ forward the frame to a transmit frame to CPE function 68 if the destination address of the frame matches an Ethernet address of one of a group of authorized CPEs that are coupled to the cable modem 50; or 3/ pass the frame up to a local host receive function 70 if the destination address of the frame matches the Ethernet address assigned to the CM host 56.

Upon receiving a frame from the downstream forwarding process 64, the transmit frame to CPE function 68 passes the frame to an Ethernet controller transmit function 72 of the Ethernet controller 54, which passes the frame to the appropriate CPE 20. If the Ethernet controller transmit function 72 is currently passing a previous frame to the CPE 20, then the Transmit frame to CPE function 68 attaches the memory buffer for the current frame to an Ethernet transmit queue 74. The Ethernet controller transmit function 72 takes frames from the Ethernet transmit queue 74 according to a predetermined order and forwards them to the CPE 20. Upon transmission of a frame to the CPE 20, the Ethernet controller transmit function 72 frees the memory buffer of the frame for re-use by the CM MAC 52 for a subsequent frame received by the CM MAC.

Upon receiving a frame from the downstream forwarding process 64, the local host receive function 70 determines from the frame header whether the frame is an IP frame or an LLC frame. If the frame is an IP frame, then the local host receive function 70 copies the frame into a Fusion stack specific data structure ("message") and passes the Fusion message to a Fusion TCP/IP host 56A. If the frame is an LLC frame, then the local host receive function 70 forwards the frame to an LLC host 56B. In either case, the memory buffer of the frame is freed by the host 56A, 56B upon completion of processing of the frame.

1.2.2 Upstream Bridging Process

Figure 4:
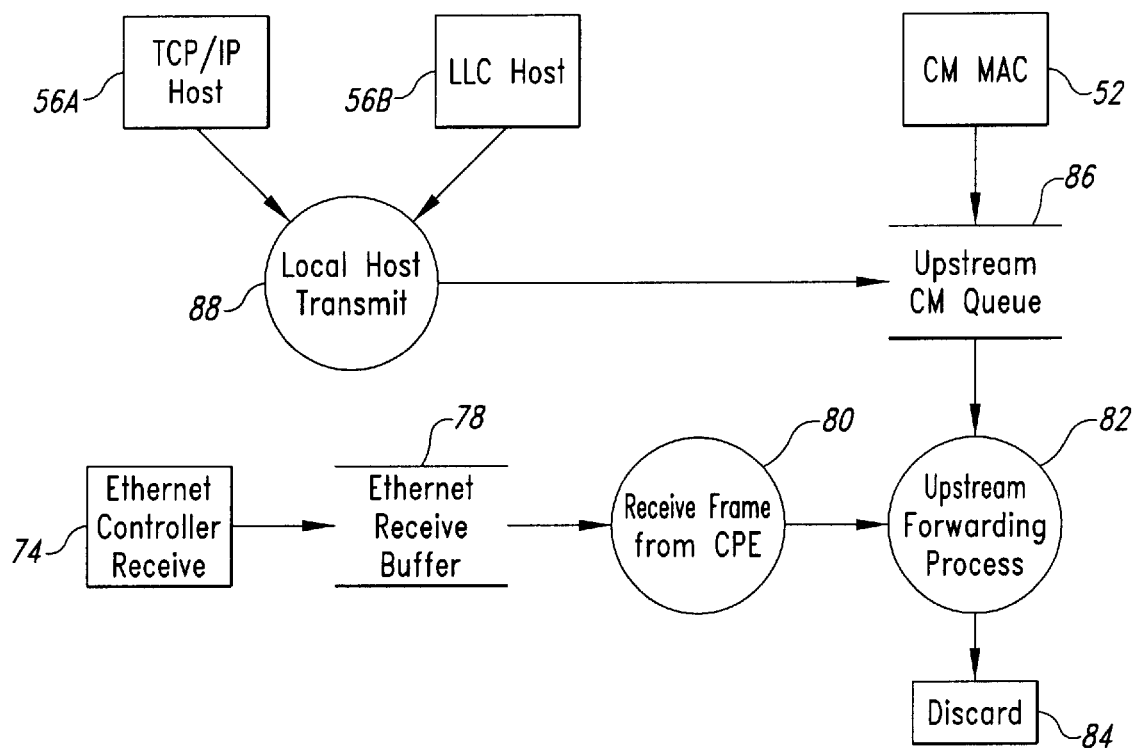
FIG. 4 is a state diagram showing a method according to an embodiment of the present invention for processing upstream message frames being sent to a cable network.

An upstream bridging process according to an embodiment of the present invention is shown in FIG. 4. An Ethernet controller receive function 76 of the Ethernet controller 54 receives Ethernet frames from the CPE 20 and stores them in respective Ethernet receive buffers 78. A receive frame from CPE function 80 of the bridge 58 receives the frames from the Ethernet controller transmit function 76 and passes the frames to an upstream forwarding process 82. The upstream forwarding process 82 reads the frame header of each frame and, based on the information in the frame header (Destination address, Source address, Type), two possible actions can follow:

1/ Discard the frame (step 84), that is, release the Ethernet receive buffer; or 2/ Forward the frame to the CM MAC 52 by placing the Ethernet receive buffer into an upstream MAC queue 86. The CM MAC 52 transmits frames in sequential order from the upstream MAC queue and releases the Ethernet receive buffers of the transmitted frames for re-use by the Ethernet controller receive function.

1.2.3 CM Upstream Transmission Process

FIG. 4 also illustrates a cable modem upstream transmission process for frames generated by the CM hosts 56A, 56B for transmission to the cable network 16. A local host transmit function 88 receives frames in memory buffers from the CM hosts 56A, 56B and places them into the upstream MAC queue 86. The CM MAC 52 transmits the frames from the upstream MAC queue 86 to the cable network 16 and frees the memory buffers for re-use by the CM hosts 56A, 56B.

1.3 CM/CPE Downstream Bridging

Figure 5:
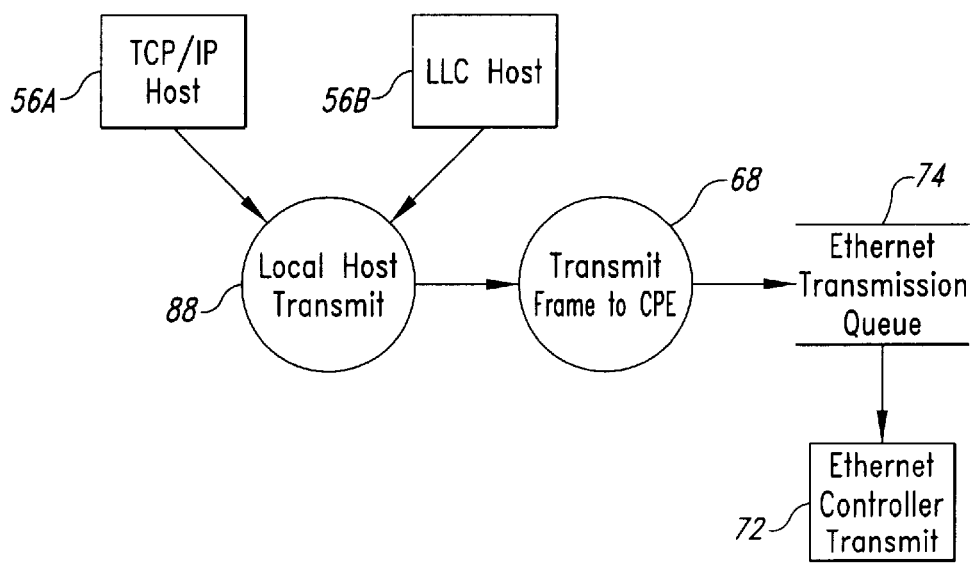
FIG. 5 is a state diagram showing a method according to an embodiment of the present invention for processing downstream message frames from a cable modem host to a customer premises equipment.

A CM/CPE downstream bridging process according to an embodiment of the present invention is shown in FIG. 5. A local host transmit function 88 receives frames in memory buffers from the CM hosts 56A, 56B and passes them to the transmit frame to CPE function 68. Upon receiving a frame from one of the CM hosts 56A, 56B, the transmit frame to CPE function 68 passes the frame to the Ethernet controller transmit function 72 of the Ethernet controller 54, which passes the frame to the appropriate CPE 20. If the Ethernet controller transmit function 72 is currently passing a previous frame to the CPE 20, then the Transmit frame to CPE function 68 attaches the memory buffer for the current frame to the Ethernet transmit queue 74. The Ethernet controller transmit function 72 takes frames from the Ethernet transmit queue 74 according to a predetermined order and forwards them to the CPE 20. Upon transmission of a frame to the CPE 20, the Ethernet controller transmit function 72 frees the memory buffer of the frame for re-use by the CM hosts 56A, 56B.

1.3 CPE/CM Upstream Bridging

Figure 6:
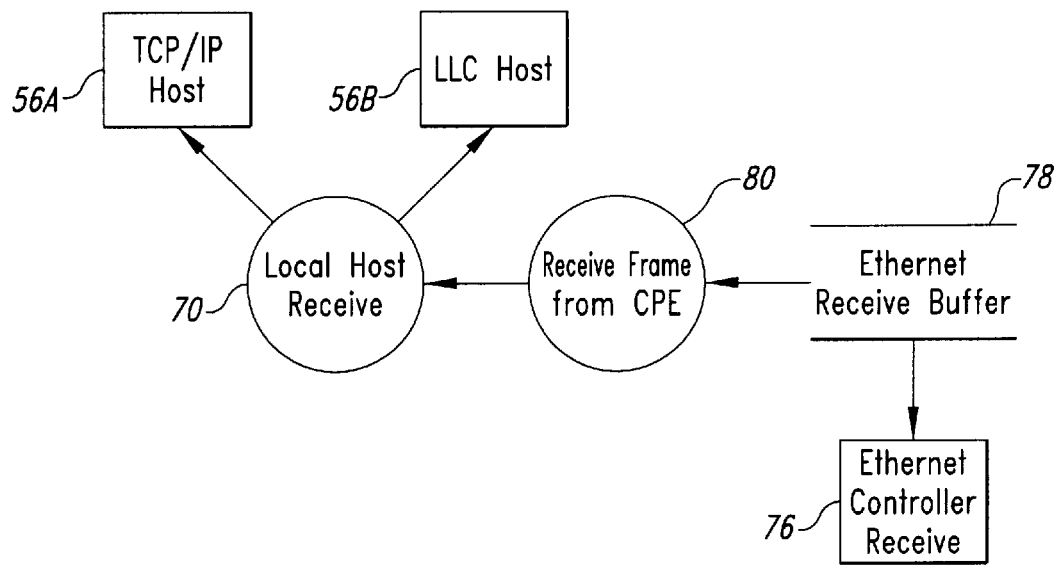
FIG. 6 is a state diagram showing a method according to an embodiment of the present invention for processing upstream message frames from a customer premises equipment to a cable modem host.

A CPE/CM upstream bridging process according to an embodiment of the present invention is shown in FIG. 6. The Ethernet controller receive function 76 of the Ethernet controller 54 receives Ethernet frames from the CPE 20 and stores them in respective Ethernet receive buffers 78. The receive frame from CPE function 80 of the bridge 58 receives the frames from the Ethernet controller transmit function 76 and passes the frames to the local host receive function 70.

Upon receiving a frame from the receive frame from CPE function 80, the local host receive function 70 determines from the frame header whether the frame is an IP frame or an LLC frame. If the frame is an IP frame, then the local host receive function 70 copies the frame into a Fusion message and passes the Fusion message to the Fusion TCP/IP host 56A. If the frame is an LLC frame, then the local host receive function 70 forwards the frame to the LLC host 56B. In either case, the memory buffer of the frame is freed by the host 56A, 56B upon completion of processing of the frame.

1.3 Forwarding Rules

Forwarding rules are based on Data Link Layer (Layer 2) as well as Network Layer (Layer 3) and Transport Layer (Layer 4), if enabled. Layer 2 rules are based on:

Ethernet Source Address

Ethernet Destination Address: Unicast, Broadcast or Multicast.

Layer 3 rules (LLC protocol filters) are based on Ethernet Type value (such as 0x800 for IP, 0x806 for ARP, etc . . . ). The Ethernet Type is found right after the Source Address for DIX framing and at the end of the SNAP header for 802.3-SNAP framing. Layer 4 rules (IP protocol filters) apply for IP traffic and are based on protocol type (ICMP, IGMP, TCP or UDP) and UDP/TCP port number.

The bridge 58 implements the forwarding rules described hereafter.

1.3.1 Downstream Forwarding Rules

The Layer 2 downstream forwarding rules implemented by the bridge 58 are as follows:

Stale frames (those that can not be delivered in a timely fashion) must be discarded: this rule is implemented by enforcing a maximum number of frames waiting in the Ethernet Transmit Queue 74. If that maximum is reached, indicating congestion on the Ethernet port, the frame is discarded.

Broadcast Ethernet frames (Destination Address= FF:FF:FF:FF:FF:FF) must be forwarded BOTH to the Ethernet CPE port AND to the CM IP host.

Multicast Ethernet frames (Group bit of Destination Address set to 1) must be forwarded to the Ethernet CPE port. However, all MAC Management frames (Destination Address=01:E0:2F:00:00:xx) must be discarded.

Unicast frames addressed to unknown destinations (Destination Address NOT found in the CPE table) must be discarded; if the address is found in the CPE table, the frame must be forwarded to the Ethernet CPE port.

Once Layer 2 filtering is complete, the frame is still subject, if enabled, to Layer 3 and Layer 4 filtering.

1.3.2 Upstream Forwarding Rules

The Layer 2 upstream forwarding rules implemented in the present bridge design are as follows:

Stale frames (those that can not be delivered in a timely fashion) must be discarded: this rule is implemented by setting a maximum number of messages in the upstream MAC queue 86. If that maximum is reached, indicating congestion on the Cable port, the Ethernet Receive process discards incoming frames.

Broadcast Ethernet frames (Destination Address= FF:FF:FF:FF:FF:FF) must be forwarded to the Cable CPE port.

Multicast Ethernet frames (Group bit of Destination Address set to 1) must be forwarded to the CM MAC port. However, all BPDU (Bridge Protocol Data Unit) frames (Destination Address=01:80:C2:00:00:xx) must be discarded.

Unicast frames from source addresses other than those provisioned or learned as supported CPE devices (Source Address NOT found in the CPE table (discussed below) or NOT marked as supported CPE) must be discarded. If the address is found in the CPE table, and if and only if it is marked as a supported CPE device should the frame be forwarded to the CM MAC 52. However, if the Destination Address is also a CPE device (Destination Address found in the CPE table), the frame must be discarded as in a traditional learning bridge.

Once Layer 2 filtering is complete, the frame is still subject, if enabled, to Layer 3 and Layer 4 filtering.

3 Bridge Data Structures

The bridge 58 will essentially handle two flows of data:

Traffic between the CM MAC 52 and the Ethernet controller 54. This is a high volume, low latency traffic.

The frames can (and will) use up to the 1500 bytes Ethernet size limit, but their contents will not change and therefore they can be handled very quickly once the decision to forward or not is taken.

Traffic between the local CM IP host and either the CM MAC 52 or the Ethernet controller 54. This is a much lower volume, higher latency traffic. Even with VoIP, this traffic is in the order of 10–20 bytes every 10 ms (plus IP &UDP headers) per channel. However these frames need to go all the way up the IP protocol stack and their buffers cannot be relinquished quickly to the CM MAC 52. On top of that, the Fusion IP stack has already its own type of data structures: the "message" (struct m).

To cope with these constraints, the bridge 58 uses simple fixed pools of memory buffers for frames coming from the CM MAC 52 and for frames coming from the Ethernet controller 54. The frames to and from the TCP/IP host 56A are copied to and from the Fusion message structures.

3.1 General DOCSIS Bridge Data Structures

Each interface, the CM MAC 52 and the Ethernet controller 54, will maintain a separate pool of fixed buffers for received frames on their respective sides. The bridge 58 is responsible to release the buffers it gets from the CM MAC 52 once the frame has been successfully transmitted on the Ethernet port or discarded. The CM MAC 52 is responsible for releasing the buffers it gets from the bridge 58, once the upstream channel transmission is complete.

3.1.1 Abbreviations used in Data Structures

Buff Buffer
Dwstr Downstream
Upstr Upstream
Fwd Forward
Ether Ethernet
Len Length
Max Maximum
Min Minimum
Hdr Header
Msg Message
Ptr Pointer
Tx Transmit
Rx Receive
Sem Semaphore 3.1.2 General Bridge Data Structures Definition define u8 unsigned char /* 8 bits on ST20 cc */
define u16 unsigned short /* 16 bits on ST20 cc */
define u32 unsigned int /* 32 bits on ST20 cc */
define boolean int
define true 1
define false 0

Note: The "canonical" maximum Ethernet frame size (as defined in the original DIX specifications) is 1518 bytes, including the Ethernet header (14 bytes), the maximum payload size (1500 bytes) and the 4-byte CRC.

The 48-bit Ethernet MAC address type is defined as follows:

typedef u8 a48[6]; /* Ethernet Address (6 bytes) */

We also define the Ethernet header we must find at the beginning of an Ethernet frame:

typedef struct ether_hdr {
u8 ether_dhost[6]; /* Destination Address (6 bytes) */
u8 ether_shost[6]: /* Source Address (6 bytes) */
u16 ether_type; /* Ethernet Type (2 bytes) */
} ether_hdr;

As a placeholder for all the Bridge control variables, we define the Bridge Control Structure as follows:

typedef struct BridgeCtl {
boolean Bridge_Up; /* true if bridge up and running */
boolean Forwarding_Enabled, /* true if forwarding enabled */
int Max_Supported_CPE; /* Maximum number of supported CPE set by CM Manager */
int Supported_CPE; /* Total number of supported CPE */
int Learned_CPE; /* Total number of learned CPE */
} BridgeCtl;
BridgeCtl BridgeControl; /* Define one control structure */

The different members of that structure are detailed below.

3.1.3 Memory Objects Management

Figure 7:
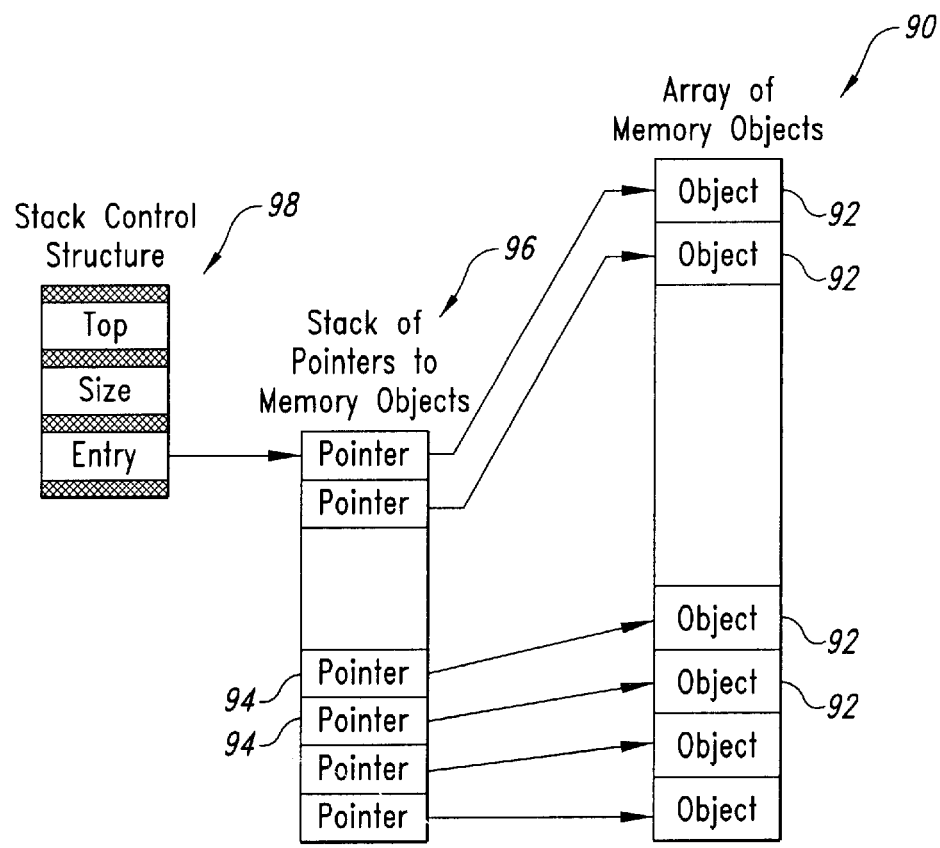
FIG. 7 is a block diagram of memory management data structures for managing cable modem memory objects according to an embodiment of the present invention.
Figure 8:
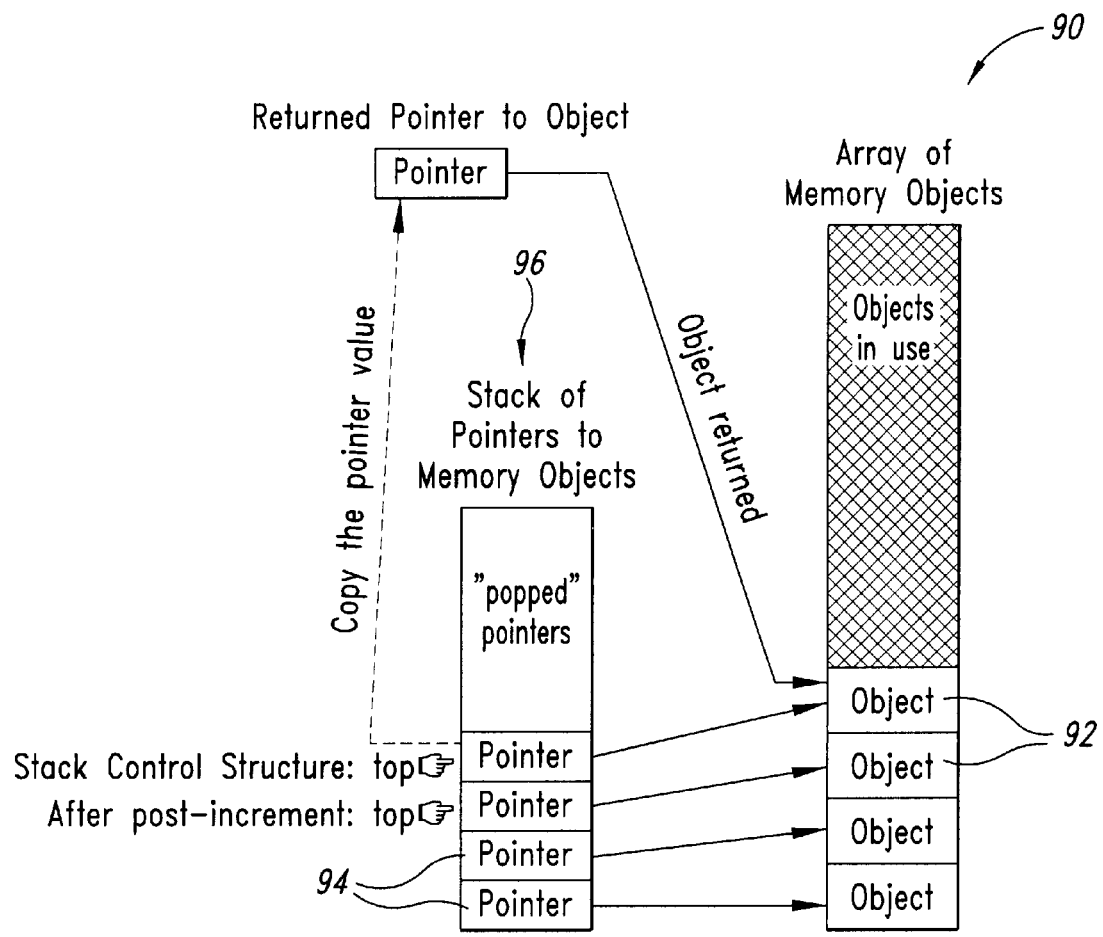
FIG. 8 is the block diagram of FIG. 7 while obtaining a memory object from a memory object pool.
Figure 9:
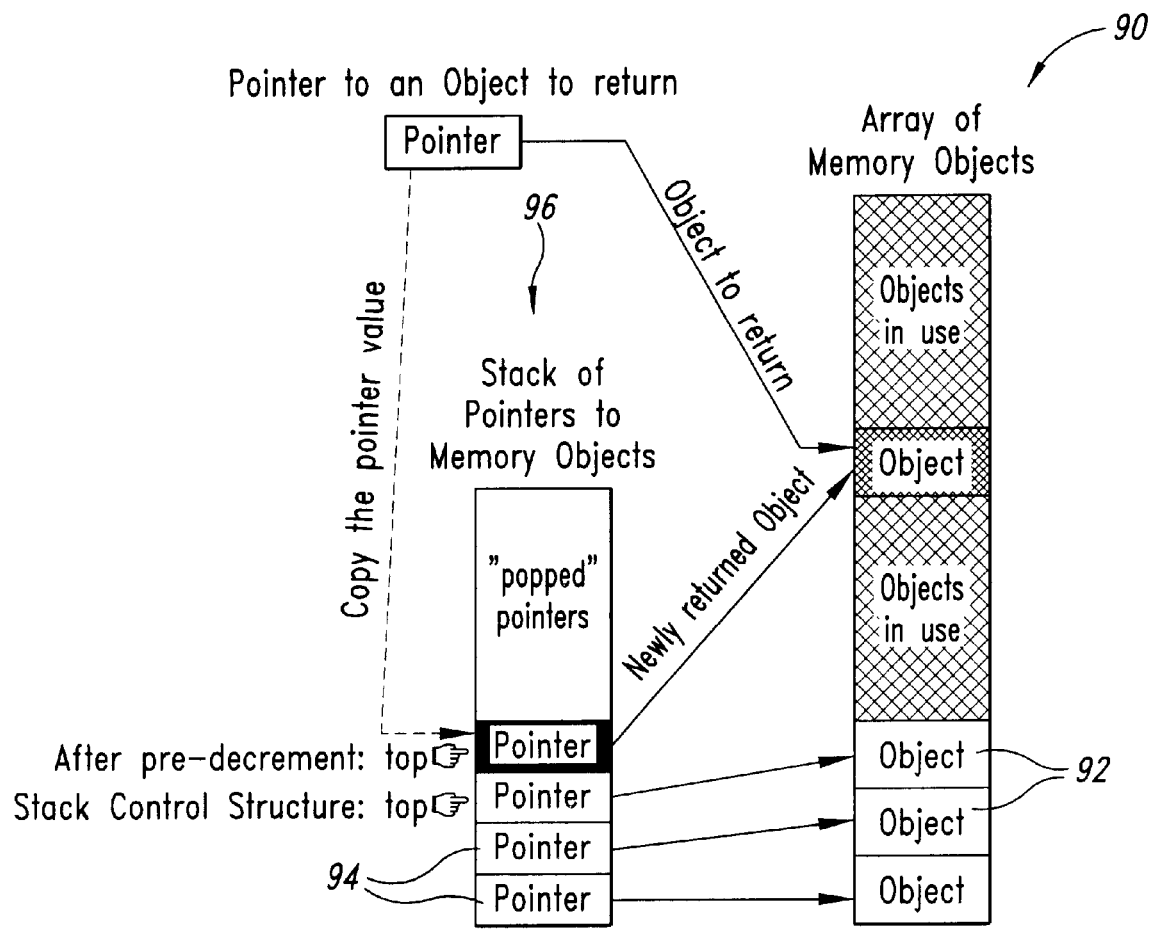
FIG. 9 is the block diagram of FIG. 7 while returning a memory object to the memory object pool.
Figure 10:
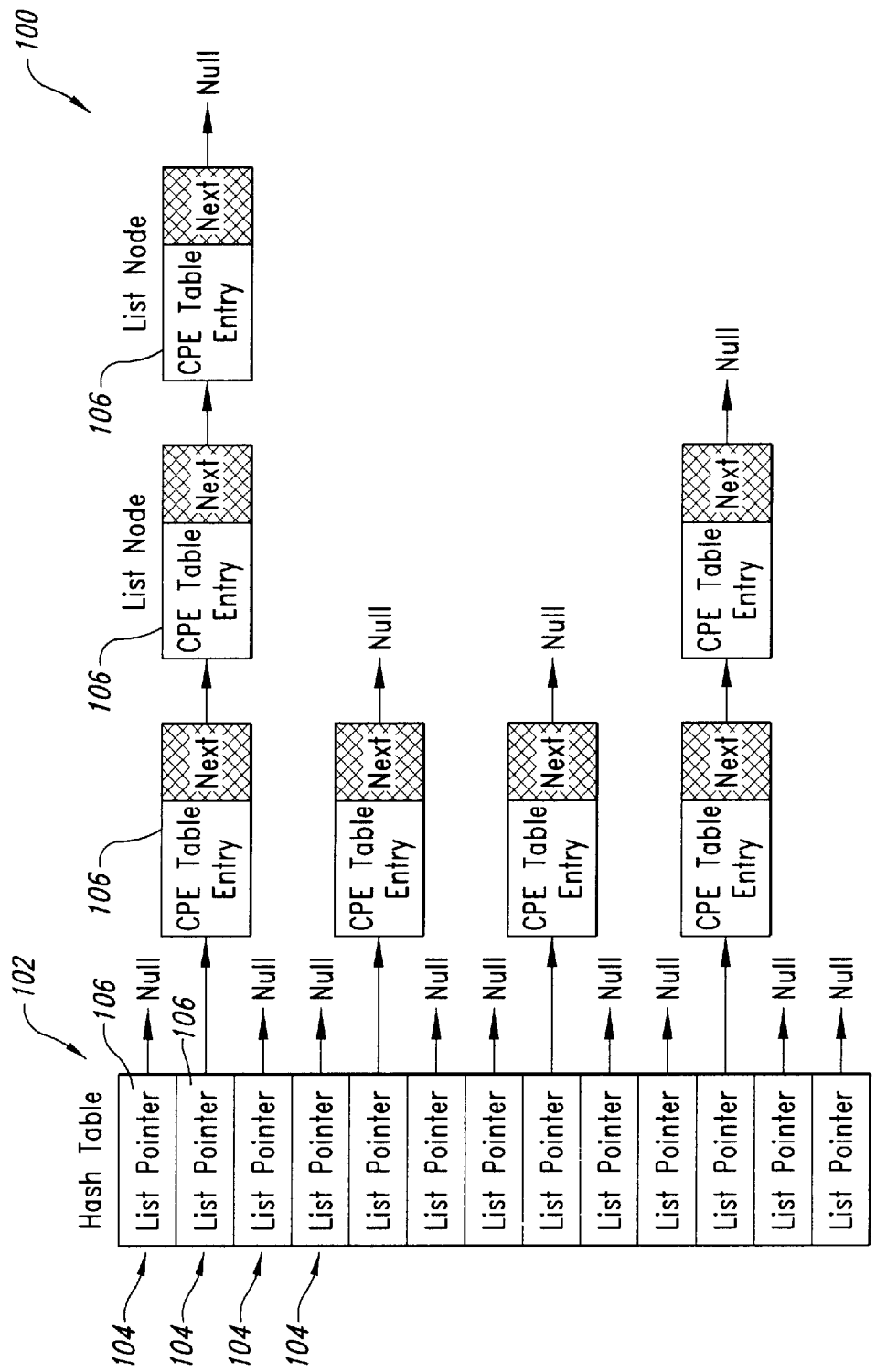
FIG. 10 is a block diagram of data structures employed to implement a customer premises equipment (CPE) address table according to an embodiment of the present invention.

To manage data structures such as buffers used by the forwarding processes, the bridge 58 employs a flexible mechanism able to provide upon request a data structure of the desired type and recycle them once the object (the data structure in this case) is not needed anymore, as shown in FIGS. 7-9. As used herein, the term "memory object" refers to data structures or collections of such structures stored in the processor's memory, either by static or dynamic memory allocation. However, the management system described herein is applicable to any kind of memory objects.

This mechanism accommodates several pools of different types of memory objects and different numbers of such memory objects in each of them. The memory management mechanism:

manages memory objects of different types and sizes;

supports any number of memory objects in each pool; and functions logically as a stack, that is, gets an object from a pool, then returns the object to it.

Each pool is implemented as an array 90 of the maximum number of the memory objects 92. The pool can be defined as ObjectType Objects[Size];.

For instance, the Downstream Forwarding Buffers pool is declared as follows:

static Dwstr_hdr Dwstr_Buff_Array[MAX_DWSTR];
/* Downstream Buffers Array */

Where "MAX_DWSTR" is the maximum number of such buffers we want to create. Note that the number of memory objects can be different for each pool. Also note that, although the memory is statically allocated in the present example, this method is valid for dynamically allocated memory as well.

Since each entry is a data structure, copying it back and forth is not desirable, especially for large data buffers. In order to access these entries, the bridge 58 uses a collection of as many pointers 94 as there are objects in the pool, logically organized as a stack 96. Each stack 96 is an array of pointers 94 where each pointer references a single object 92 in the pool and is defined as:

void *Pointer_Stack[Size];

To bridge 58 defines the downstream buffers pointer stack as:

static void *Dwstr_Ptr_Stack[MAX_DWSTR];
/* Downstream Buffers Pointers Stack */

Since the pointers are of type void, they can point to any type of memory objects. The stack operation is controlled through a stack control structure 98:

```
typedef struct Stack_t
{
int top; /* points to next available entry */
int size; /* number of elements in the pool */
void **entry; /* points to the pointer array */
} Stack_t;
```

The top field is an index pointing to the next available pointer in the stack (like a stack pointer). The size field indicates how many objects this pool manages (can vary from one pool to another, according to each task need). The entry field is a pointer to the first element of the array of void pointers.

This system allows a stack-like management of pools of objects of any type and of any quantity, through a universal control structure type (Stack_t).

Two universal API's allow the bridge 58 to retrieve an object from the pool and to return the object to it:

```
void *Get_Object(Stack_t *s); /* Get new object from stack */
void Return_Object (void *object, Stack_t *s);
/* Return an object back to stack */
```

Once again, using void pointers allows accommodating any type of objects.

To get an object from the pool as shown in FIG. 8, the pointer located at the present index value of the top field is returned; the top field is post-incremented. If the top field reaches the size field value, a NULL pointer is returned instead, indicating that the stack has been emptied.

To return an object to the stack as shown in FIG. 9, the top field is pre-decremented and the pointer value is written to the pointer array 96 at the new index value of the top field.

To initialize a stack, each pointer in the pointer array is initialized to point to one memory object in the object array. The fields of the stack control structure 98 are also initialized appropriately; note that the size and entry fields remain constant throughout the stack operation, the top field is initialized to 0.

3.1.4 Enumeration Types Definitions

In order to support the incoming frames sorting and filtering process, the following enum types are also defined:

```
enum Eth_Frame_Type {
Broadcast=1, /* Ethernet Broadcast Frame */
Multicast, /* Multicast frame: bit 0 of first byte is 1 */
Unicast, /* Unicast frame not addressed to CM */
Unicast_CM_Host /* Matches CM's own MAC address */
}; /* Set by examining Ethernet frame Destination Address */
enum Fwd_Decision {
Discard=1, /* Discard the frame */
CM_Host, /* Forward to the CM local IP Host */
Ethernet_Port, /* Forward to the CPE Ethernet port */
DOCSIS_Port, /* Forward to the RF Cable port */
}; /* returned by forwarding rules */
```

3.2 CM MAC and Ethernet Controller Data Structures 3.2.1 CM MAC to Bridge Downstream Data structures In the downstream direction, the buffer received from the CM MAC 52 actually contains the full CM MAC frame, starting with the DOCSIS header. Before passing the frame to the bridge 58, the CM MAC software will overwrite the first 6 bytes of the DOCSIS header in order to include the following information:

A pointer to the beginning of the Ethernet frame itself (4 bytes).

Length of the Ethernet frame (2 bytes).

Because the DOCSIS header is of variable length, the bridge 58 uses the pointer to know where the Ethernet frame effectively begins inside the buffer. Once the buffer is not needed anymore (silent discard, transmission over the Ethernet port, copy to the Fusion IP stack), it is returned back to the downstream buffer pool.

Data Structures Definitions:

The buffer we get from CM MAC 52 begins with a specific header prepared by a downstream MAC driver in the CM MAC, overwriting the originally received CM MAC Header. This header contains information about the Ethernet frame beginning and length:

```
#define MAX_DWSTR_LEN 1800 /* maximum length of DOCSIS frame */
typedef struct Dwstr_hdr {
u8 * Ether_Ptr; /* effective start of frame */
u16 Ether_Len; /* Ethernet frame length */
u8 PDU_Buff[MAX_DWSTR_LEN]; /* Data buffer */
Stack_t *stack; /* Buffer stack this buffer comes from */
} Dwstr_hdr;
```

The bridge maintains a pool of such Downstream buffers, using the stack based management system described above:

```
Stack_t Dwstr_Pool;
/* Downstream Buffers Pool Control Structure */
static void *Dwstr_Ptr_Stack[MAX_DWSTR];
/* Downstream Buffers Pointers Stack */
static Dwstr_hdr Dwstr_Buff_Array[MAX_DWSTR];
/* Downstream Buffers Array */
```

If the downstream Buffer must be transmitted over the Ethernet interface, the pointer to that buffer is transmitted to the Ethernet controller transmit process using the Ethernet Transmission Queue that provides both a queuing mechanism for outbound Ethernet frames and a synchronization mechanism between the Downstream Forwarding task 64 and the Ethernet Controller ISR (Interrupt Service Routine).

```
message_queue *Dwstr_Fwd_Queue=&Dwstr_Fwd_Queue_Struct;
/* Downstream Forwarding Message Queue */
```

Each message contains a pointer to a Downstream MAC Buffer. The total number of messages in the queue provides a flow control mechanism for the downstream traffic: if there is no more empty message available, indicating a congestion of the Ethernet network on the CPE side, newly arrived frames are dropped instead of being queued.

3.2.2 Bridge to DOCSIS Upstream Data Structures

In the upstream direction, the bridge 58 will maintain a pool of fixed size Ethernet receive buffers 78 dedicated for the upstream-bridged traffic.

Data Structures Definitions:

The buffers used for Upstream forwarding are defined as follows:

```
#define MAX_ETHER 1600 /* maximum length of Ethernet frame */
#define MAX_MSG 10 /* start with a pool of 10 buffers */
#define MSG_SIZE (MAX_ETHER+sizeof(int)*2)
/* max Ethernet frame size+2 words */
typedef struct Upstr_hdr {
int len; /* frame length */
int service; /* Service type for CM MAC */
char frame[MAX_ETHER]; /* Ethernet frame */
Stack_t *stack; /* Buffer stack this buffer comes from */
} Upstr_hdr;
```

The Upstream Buffer pool 78 will be implemented using the stack based management system described before:

```
Stack_t Upstr_Bri_Pool;
/* Upstream Bridging Buffers Pool Control Structure */
static void *Upstr_Bri_Ptr_Stack[MAX_BRI_UPSTR];
/* Upstream Bridging Buffers Pointers Stack */
static Upstr_hdr Upstr_Bri_Buff_Array[MAX_BRI_UPSTR];
/* Upstream Bridging Buffers Array */
```

Note that a similar but separate buffer pool is implemented for the CM Local Host as discussed below in Section 4.2.2.

To queue each Upstream Buffer from the Ethernet receive ISR to the Upstream Forwarding task, an Upstream Message queue is implemented:

```
message_queue *Upstr_Fwd_Queue=&Upstr_Fwd_Queue_Struct;
/* Upstream Forwarding Message Queue */
```

3.2.3 CPE MAC Address Table

The cable modem 50 maintains a table 100 of Ethernet MAC addresses of CPE devices connected to the cable modem. This table 100 is filled by either CM provisioning (stored into NV RAM, or set through a configuration file), or learning (by listening to the Ethernet port, and taking note of the Ethernet source address).

The CM 50 is set to support frames forwarding for up to a maximum number of CPE devices (device-dependent, or set by CMTS). However, it is necessary to keep track of other CPE devices connected to the Ethernet port, even though they are not taking part in the forwarding process, in order to filter out traffic between two CPE's.

Each CPE device information will be stored into a record as follows:

```
typedef struct MAC_addr {
  a48 address; /* MAC address for this entry */
  u8 supported; /* Boolean:1=TRUE, 0=FALSE */
  u8 provisioned; /* 1=provisioned, 0=learned */
  u8 forwarding; /* Forwarding instructions for this entry */
} MAC_addr;
```

The supported field indicates whether that particular CPE is supported by the cable modem (i.e. the CM will forward its traffic back and forth). If the CPE is not supported, then all frames to and from that CPE will be discarded by the bridge 58. The provisioned field indicates whether that particular CPE has been provisioned by the CM (from the downloaded configuration file or through SNMP) or it has been learned by listening to the CPE port; it is only relevant when supported is true.

The forwarding field indicates how frames are to be forwarded to and from the CPE associated with the entry. For example, the forwarding field can indicate that only http-type frames, TCP/IP frames, LLC frames, no frames, or all types of frames should be forwarded to and from the associated CPE. The CM manager 59 is programmed to set or change the value of the forwarding field as instructed by frames received from the cable system operator via the cable network 16, CM MAC 52, and bridge 58. It is envisioned that the level of service specified by the forwarding field will depend on the fees paid to the cable operator by the user of the associated CPE.

Since the table needs to be searched at least once for each incoming frame from the DOCSIS Cable port as well as from the Ethernet port, the bridge employs a fast and efficient method to search the CPE MAC address table 100. For that reason, the CPE MAC address table is implemented using a hash table 102.

To achieve a maximum spread of indices, the hashing function used by the bridge 58 combines the last 3 bytes of the Ethernet address: the first 3 bytes being assigned to the manufacturer by the IEEE (e.g. for STMicroelectronics: 00:80:e1:xx:xx:xx). Also to maximize the spread, the table size is chosen as a prime number.

```
#define Hash(addr) (((addr[5])+(addr[4])+(addr[3])) %HASHSIZE)
```

Note: Several hashing functions can be simulated and tested on a large number of random addresses to check which one produces the best spread of indices. One embodiment of the bridge 58 uses the function defined above.

Since the hashing function can produce the same key for different addresses, each hash table entry 104 can contain several records. Hence, each hash table entry 104 will be a null terminated linked list of one or more nodes 106. A first node 106 of each linked list points to either a null value or to the first CPE table entry (MAC_addr record). Each subsequent node of the linked list includes a subsequent CPE table entry and a pointer to the next record or the null value.

```
typedef struct ListNode{ /* List Node with a link to "next" */
  MAC_addr entry; /* CPE MAC address record */
  struct ListNode *next;
} ListNode;
typedef struct List{ /* Define a linked list of "ListNode" */
  int count; /* Number of nodes in the list */
  ListNode *head; /* Pointer to first node (head) */
} List;
#define HASHSIZE 37 /* Size of hashing table (prime number) */
typedef List HashTable[HASHSIZE];
/* Define Hash table as an array of linked lists */
HashTable CPE_Table; /* CPE MAC Address Table */
```

To ensure that enough list nodes 106 entries are available, a pool of "MAX_CPE" list nodes 106 is created, using the stack based mechanism described before, from which we will draw a new entry each time we need to add one to the CPE table 100.

```
static Stack_t CPE_Pool;
/* Create a stack of "MAX_CPE" ListNode's */
static void *CPE_Ptr_Stack[MAX_CPE];
/* Stack of pointers to ListNode elements */
static ListNode ListNode_Array[MAX_CPE]={0};
/* Array of list nodes, initialized to 0 */
```

The bridge 58 will need to "pop" a pointer from the stack, and use the "ListNode" structure it is pointing to, each time a new CPE is either provisioned from the TFTP Configuration file or learned by listening to the Ethernet port. The Bridge will need to "push" a pointer back to the stack, thus releasing the "ListNode" structure it is pointing to, in the case of a CPE being provisioned after the maximum number of CPE's has been reached: the bridge will have to lookup the CPE table for a CPE that has been learned and remove it, since provisioned addresses must take preference over learned addresses.

Since at least two tasks, namely the downstream and upstream forwarding processes 64, 82, can access the CPE table 100, the bridge 58 implements an access synchronization mechanism to that common resource. The access synchronization mechanism is a mutual exclusion semaphore (mutex):

```
osw_mutex_t CPE_Table_Sem; /* CPE Table Access Semaphore */
```

The first task wanting to access the table will "wait" on the mutex, but since the mutex is free, the first task will obtain access. If a second task wants to access the same CPE table 100 immediately after that, it will have to wait until the first task has released the mutex once finished accessing the table.

3.3 CM MAC / CM IP Host Data Structures
3.3.1 Fusion Inbound Receive Data Structures Downstream frames for the CM IP host 56A are received on a pool of buffers managed by the CM IP host receive process 70. Once a downstream frame is determined to be intended for the local CM IP host 56A, by matching its Ethernet destination address with the CM MAC address, the CM IP host receive process 70 will obtain a Fusion message ("m" buffer) from the Fusion heap by invoking the function lwq_getbuf( ) and copying the frame contents into it. The Fusion message (m) structure is defined in the Fusion header file: m.h The CM IP host receive process 70 is running in a different task context than the downstream forwarding task 64. A message queue is used by the downstream forwarding task 64 to pass the received Downstream Buffer address to the CM IP host receive task 70.

message_queue Fusion_RX_Queue;
/* Fusion Receive Task message queue */

3.3.2 Fusion Outbound Transmit Data Structures

Outbound frames from the Fusion IP stack 56A come within Fusion messages (m structures). The bridge specific send routine (bridge_start( ) ) will copy the message contents into an Upstream buffer from a dedicated buffer pool, then invoke the CM MAC upstream send API (docsisdrv_SendPdu( ) ). The Fusion Upstream buffer pool is defined as follows:

static Stack_t Upstr_CM_Pool;
/* Upstream Fusion Buffers Pool Control Structure */
static void *Upstr_CM_Ptr_Stack[MAX_CM_UPSTR];
/* Upstream Fusion Buffers Pointers Stack */
static Upstr_hdr Upstr_CM_Buff_Array[MAX_CM_UPSTR];
/* Upstream Fusion Buffers Array */

When returning to ndq_start( ), the function will release the Fusion message back to the Fusion heap (m_dispfn).

If no upstream buffer is available, the bridge_start( ) function will return without sending the frame; the outbound datagram is therefore lost. Retransmission of UDP datagrams is the responsibility of the UDP based application.

3.4 Bridge / Cable Modem Manager Data Structures

The Cable Modem Manager interface with the Bridge is performed through the Bridge Control Structure:

typedef struct BridgeCtl {
boolean Bridge_Up; /* true if bridge up and running */
boolean Forwarding_Enabled; /* true if forwarding enabled */
int Max_Supported_CPE; /* Maximum number of supported
CPE set by CM Manager */
int Supported_CPE; /* Total number of supported CPE */
int Learned_CPE; /* Total number of learned CPE */
} BridgeCtl;
BridgeCtl BridgeControl; /* Define one control structure */

The bridge 58 is not allowed to start data transfer between CM MAC 52 and the CM IP host 56A until the Bridge_Up flag is set to "true". This flag can be set or reset either by the Cable Modem Manager, using the appropriate API, or by the CM IP host 56A, when calling the bridge_updown( ) function.

The bridge 58 does not start Downstream and Upstream forwarding processes until instructed to do so by the Cable Modem Manager by setting the Forwarding_Enabled flag. The Forwarding_Enabled flag is set to false by default. The Cable Modem Manager will eventually set it to true after successful registration.

The maximum number of CPE's supported by the bridge 58 is fixed to MAX_CPE. However, the number of effectively supported CPE's (lower than max) is kept in the Max_Supported_CPE variable whose value can be set by the Cable Modem Manager following the parsing of the CM Configuration file. The Supported_CPE and Learned_CPE variables keep track of the number of supported and learned (as opposed to provisioned) CPE's, respectively.

4 Bridge Application Programming Interfaces (API's)
4.1 Bridge Interface with CM MAC
4.1.1 Downstream Bridge / MAC Interface The bridge 58 communicates with the CM MAC 52 by application programming interfaces (API's) defined below. In the downstream direction, the bridge 58 provides a buffer to the CM MAC (from the Downstream Buffer pool) and invokes the CM MAC receive API:

Dwstr_Buffer=Get_Object(&Dwstr_Pool);
Dwstr_error=docsisdrv_RecvPdu( (unsigned char *)Dwstr_Buffer,
(int)MAX_DWSTR_LEN);

This blocking API call will return only upon a CM MAC frame reception, successful or unsuccessful. The downstream forwarding process will be pending on this API call and process the received CM MAC frame.

4.1.2 Upstream Bridge / MAC Interface

In the upstream direction, the API to the Upstream CM MAC contains three pieces of information:

Length of Ethernet payload;
Service # (used by CM MAC to compute the SID); and
The upstream Ethernet frame itself.

The Ethernet Controller receive interrupt service routine (ISR) will allocate a buffer of type Upstr_Hdr from the Upstream Forwarding Buffer pool and fill it out with the contents of the Ethernet frame. The Upstream forwarding task 82 will add, if the frame is to be forwarded, the length of the Ethernet frame and the service type. The frame is passed to the CM MAC 52 through this API:

Upstr_error=docsisdrv_SendPdu(Service_Type,
Upstr_Buff→frame,
Upstr_Buff→len);

Until further clarification, the service type field will be set to 0.

Although the upstream traffic from the cable modem IP host 56A, 56B could be passed to the CM MAC 52 using the very same Buffer pool, it was decided to use an identical but separate Buffer pool (Upstr_CM_Pool) with an identical buffer format (Upstr_hdr) for that purpose. That prevents the higher priority upstream bridged traffic from potentially "starving" the CM IP host 56A, 56B by consuming all the available buffers. The CM MAC upstream transmission API can be invoked by both the Upstream Forwarding process and the Fusion send routine. The CM MAC driver is responsible for copying the Upstream buffers to its own queue and handling the possible reentrancy situations.

4.2 Bridge Interface with Fusion IP Stack
4.2.1 Fusion Downstream Receive Interface The Fusion IP stack 56A will receive Ethernet frames, that match the CM MAC address, from the Downstream forwarding task 64. Once a downstream frame is routed to the local Fusion IP stack 56A, the local host receive process 70 will get a Fusion message of the appropriate size from the Fusion heap by calling the function lwq_getbuf( ) and copy the frame contents into the message buffer (pointed to by mp→m_hp). If no Fusion message is available from the Fusion heap, the frame is discarded. In either case, the Downstream buffer is returned to the Downstream Buffer pool and the incoming message is queued into the Fusion's bridge device receive queue (lq_in( )).

The whole local host receive process 70, activated by the API call lwq_recv_task( ) runs in a different task context (local host receive task) than the downstream forwarding task (see section 5.1). The local host receive task 70 is activated by the Downstream Forwarding process 64 sending a message on the Fusion receive message queue: Fusion_RX_Queue. Fusion LWQ queuing routines (lwq.c) are enabled (compile option: LWQ)

4.2.2 Fusion Upstream Transmit Interface

In the upstream direction, the bridge 58 is seen as a Fusion network link layer device and therefore has an entry in the Network Device Table (ndevsw[ ]) with the following values (see Fusion Porting Guide, Chapter 5):

| | | |
|---|---|---|
| nd_name | = "DOCSIS Bridge" | |
| nd_lladdr | = {AF_ETHER} | Ethernet-like Link Layer |
| nd_init | = bridge_init | Bridge init function |
| nd_updown | = bridge_updown | Bridge up/down function |
| nd_send | = en_scomm | Standard Ethernet send function |
| nd_start | = bridge_start | Bridge start Ethernet Tx function |
| nd_ioctl | = bridge_ioctl | Bridge control function |

The Fusion Device Transmission queue (nd_xmitq) is disabled (compiler option: NO_TRANSMIT_Q) since the bridge upstream forwarding process 82 implements its own upstream message queue 86. In order to transmit a frame upstream, the Fusion IP stack 56A will call its standard Ethernet send function (en_scommo( )), where the Ethernet header is pre-pended to the outgoing IP packet. The next function called (ndq_start( )) will dereference the nd_start pointer in the ndevsw structure in order to call the bridge-specific send routine:

bridge_start( ) .

The bridge-specific send routine (bridge_start( )) will copy the message contents into an Upstream message buffer from the Fusion Upstream buffer pool, and invoke the CM MAC upstream API (docsisdrv_SendPdu( )) with length and service type. When returned to, the ndq_start( ) function will release the Fusion message back to the Fusion heap (m_dispfn): see ndq_start( ) in m.c.

4.3 Bridge Interface with Cable Modem Manager

The Cable Modem Manager is a portion of the cable modem 50 that controls the operation of the bridge by setting a certain number of parameters, especially during the IP connectivity phase. Also, the configuration file downloaded through TFTP may contain some bridge-related parameters such as the maximum number of CPE's and CPE MAC addresses to provision into the CPE Table 100. The CM Manager interfaces with the bridge 58 through the following set of three API's.

4.3.1 Initialize Bridge Data Structures

The function prototype is:

void br_bridge_init(void);/* Initialize Bridge data structures */

This function will initialize the various message queues and semaphores upon which the different tasks rely for communicating and transferring data. In addition, it will initialize the CPE Table data structures: hash table 102, list nodes buffers and stack.

4.3.2 Set Bridge Operating Parameters

The function prototype is:

int br_bridge_set (bridge_cmd parameter, int value);

/* Set a Bridge parameter to desired value */

This API allows the CM Manager to set a bridge parameter, such as Downstream/Upstream forwarding, to a given value. The supported parameters are defined in the enum bridge_cmd. They are:

BRIDGE_UP Can be set to "true" or "false".

FORWARDING_ENABLED Can be set to "true" or "false".

MAX_NUMBER_CPE Can take any integral value between 0 and the maximum number of CPE's supported by the DOCSIS Bridge. This maximum number isspecified by the constant declaration MAX_CPE (see section 3.4). The returned value is either "true" (the required parameter was set successfully) or "false" (the required parameter could not be set to the required value).

4.3.3 Provision a CPE MAC Address

The function prototype is:

int br_provision_CPE (a48 address);

/* Provision a CPE MAC address */

This API allows the CM Manager to provision a CPE MAC Address, following the parsing of the CM Configuration File downloaded through TFTP. The address parameter is the 48-bit CPE MAC address to provision. The returned value is either "true" (the required parameter was set successfully) or "false" (the required parameter could not be set to the required value).

4.4 Bridge Interface with CPE Interface Ethernet Controller 4.4.1 Downstream Ethernet Transmit Interface The bridge downstream forwarding process 64 needs to transmit Ethernet frames on the CPE Ethernet port and, when transmission is not possible immediately because the Ethernet controller is already transmitting a frame, queue them for transmission at a later time by the End of Transmission Interrupt handler or thread. The API for transmitting a frame on the Ethernet port is:

void Ether_Start(Dwstr_hdr *Dwstr_Buffer);

/* starts Ethernet transmission of frame in downstream buffer */

This routine will set the Ethernet controller 54 to transmit the downstream frame passed as a parameter and also set the Ethernet Transmission flag:

volatile boolean Ether_TX_Active; /* transmission active flag */

This flag will be reset by the Ethernet End of Transmission Interrupt handler or thread. It is used as a "busy" signal to the downstream forwarding process, indicating that a frame is being transmitted and that subsequent frames must be queued.

The downstream forwarding process 64 uses a message queue 74 to communicate with the Ethernet controller 54: it copies a pointer to the downstream buffer into it.

message_queue *Dwstr_Fwd_Queue=&Dwstr_Fwd_Queue_Struct;

/* Downstream Forwarding Message Queue */

The Ethernet End of Transmission Interrupt handler or thread will check this message queue: if there is a downstream buffer in the queue, it will immediately start transmitting it, using the Ether_Start( ) API, and leave the Ether_TX_Active flag set to "1". If the queue is empty, it will reset the Ether_TX_Active flag and return.

The downstream forwarding process 64 must put all downstream frames for the CPE Ethernet port into the message queue 74, and then check the Ether_TX_Active flag:

If it is reset, the message queue is read and, if there is a message inside, the downstream buffer is immediately transmitted, using the Ether_Start( ) API.

If it is set, no action is performed: The Ethernet End of Transmission Interrupt handler will check this message queue, as indicated before.

4.4.2 Upstream Ethernet Receive Interface

Ethernet frames are received on the CPE Ethernet port of the Ethernet controller 54 and copied into an Upstream buffer 78 from the Upstream buffer pool. On the ST20-JEI platform, the upstream buffer is pre-allocated before the frame reception and the Ethernet controller 64 copies the received frame into the frame field of that buffer. On the Explorer platform, the received frame will be copied from the CS8900 memory into the Upstream buffer by the enet0_Thread( ) thread.

The Ethernet controller chip must be set to "promiscuous mode": it must accept any Ethernet frame, regardless of its destination address. Frame processing and filtering will be performed by the Upstream Forwarding task 82.

Upon successful frame reception, during the Ethernet receive ISR (or thread), the Upstream Buffer 78 is passed to the Upstream Forwarding task 82 by copying a pointer to the Upstream buffer into the Upstream Message queue 86:

message_queue *Upstr_Fwd_Queue=&Upstr_Fwd_Queue_Struct;

/* Upstream Forwarding Message Queue */

The Upstream Forwarding task 82 is pending on that message queue and will process the Upstream frame, and then return the buffer back to the pool. After sending the received frame into the Upstream Message queue 86, the Ethernet receive ISR gets a new Upstream Buffer 78 from the Upstream buffer pool for the next received Ethernet frame.

5 Bridge Task Partitioning and Process Flow 5.1 Task Partitioning

The bridge 58 is concurrently running two separate tasks: the Downstream Forwarding task 64 and the Upstream Forwarding task 82. In parallel the local host receive task 70 is processing the incoming frames destined to the CM host 56A, 56B, thus avoiding to tie-up the Downstream bridged traffic while a frame is being processed up the CM host.

5.2 Downstream Bridging Tasks and Interrupts

In the downstream direction, one task will be implemented: the downstream forwarding task 64. In addition, for the ST20-JEI platform, two interrupt handlers associated with the Ethernet controller 54 will be used. On the Explorer platform, a short ISR, enet0_Isr( ) and a specific thread, enet0_Thread( ) will be used Notes:

1. All details related to the MACE Ethernet Controller chip and its interrupt handlers are specific to the ST20-JEI platform.

2. On the MACE chip, the Transmit and Receive interrupt share the same interrupt handler, a checking of the Interrupt Status allows to branch to the Rx or Tx part of it, although in the present document, they are described as two separate handlers, for clarity purposes.

3. Similarly, on the Explorer platform, the enet0_Thread( ) contains sections of code for the downstream forwarding task 64, as well as code for the upstream forwarding task 82. Details for the upstream forwarding part are provided in section 5.3.

5.2.1 Downstream Forwarding Task

The downstream forwarding task 64 receives the DOCSIS frame buffer, and either discards the frame, passes it to the local host receive function 70 or to the Ethernet Transmission queue 74 (see section 1.2.1). The simplified process flow is:

```
Get buffer from Downstream Buffer pool
While (true)
invoke CM MAC receive API (blocking until frame received).
If Bridge device is not "Up"
Continue: Go to next iteration of "while" loop with same buffer.
End If
check Ethernet frame Destination Address (DA)
DoCase [DA]
Case: Broadcast
get a message structure from Fusion message buffers
If Fusion buffer available
Copy frame contents into Fusion message buffer
Queue message into Fusion inbound queue
Signal Fusion Receive Task Semaphore
End If
If Forwarding_Enabled
forwarding_decision=Forward to Ethernet
Else
forwarding_decision=Discard
End If
break
Case: Multicast
If DA==CM MAC Management frame
forwarding_decision=Discard
Else
   get a message structure from Fusion message buffers
   If Fusion buffer available
   Copy frame contents into Fusion message buffer
   Queue message into Fusion inbound queue
   Signal Fusion Receive Task Semaphore
   End If
   If Forwarding_Enabled
   Forwarding_decision=Forward to Ethernet
   Else
   Forwarding_decision=Discard
   End If
End If
Break
Case: Unicast, addressed to CM IP host
forwarding_decision =CM_Host
break
Case: Unicast, NOT addressed to CM IP host
If Forwarding_Enabled
   Get exclusive access to CPE_Table
   Search CPE_Table for DA
   If Found AND Supported TRUE
      forwarding_decision=Forward to Ethernet
   Else
      forwarding_decision=Discard
   End If
   Release exclusive access to CPE_Table
Else
   forwarding_decision=Discard
End If
break
End Case
DoCase [forwarding_decision]
Case: Discard
Break (will reuse the same buffer for the next Downstream frame).
```

Case: Forward to Ethernet
Queue Downstream Buffer into Downstream Forwarding queue.
If No Ethernet Transmission Ongoing
   If there is a message in Downstream Forwarding queue
      Read message queue, get Downstream buffer pointer.
      Release message.
      Start Ethernet Frame transmission.
   End If
End If
Get a new Downstream buffer from Downstream Buffer pool
break
Case CM_Host:
Queue Downstream Buffer into Downstream Fusion queue.
Get a new Downstream buffer from Downstream Buffer pool
break
End Case
End While 5.2.2 Ethernet Controller Transmit Interrupts The following two interrupts complete the downstream forwarding task, on the ST20-JEI platform:
MACE Interrupt (Transmission complete)
Transmit FIFO Empty
The simplified process flows are:
MACE Interrupt (Transmission complete):
Disable Transmit FIFO Empty Interrupt
Return Downstream buffer back to Downstream Buffer pool
   If there is a message in Downstream Forwarding queue
      Read message queue, get Downstream buffer pointer.
      Release message.
      Start Ethernet Frame transmission
   End If
Dismiss Interrupt
On the Explorer platform, a similar process flow is performed in the relevant "case" of the enet0_Thread( ).
Transmit FIFO Empty:
If more than 64 bytes left to transmit
   Copy 64 bytes (32 16-bit words) to Tx FIFO
Else
   Copy remaining number of bytes to Tx FIFO
   Disable Transmit FIFO Empty Interrupt
End If
Dismiss Interrupt 5.3 Upstream Bridging Tasks and Interrupts In the Upstream direction, for bridged traffic (from the Ethernet controller 54), one Upstream Forwarding task 82 will be implemented. In addition, for the ST20-JEI platform, two interrupt handlers associated with the Ethernet controller (MACE) are part of that process.

For the CM Host 56A, the local host transmit routine (bridge_start( )) will be called by the Fusion task device sending routine: ndq_start. It will operate in the original Fusion application task context and transmit the frame directly to the Upstream CM MAC driver, as described in section 5.5.

Note: On the MACE chip, the Transmit and Receive interrupt share the same interrupt handler, a checking of the Interrupt Status allows to branch to the Rx or Tx part of it, although in the present document, they are described as two separate handlers, for clarity purposes. On the Explorer platform, this is one "case" of the enet0_Thread( ).

5.3.1 Upstream Forwarding Task

The upstream forwarding process 82 operates on frame received from the Ethernet controller 54 and either discards them or forwards them to the CM MAC 52. The simplified process flow is:

While (true)
   wait for Upstream Forwarding message queue from Ethernet Rx Interrupt
   read message from queue, get Upstream buffer pointer
   release Upstream Forwarding message
   If Bridge device is not "Up"
      Return Upstream buffer to Upstream Buffer pool.
      Continue: Go to next iteration of "while" loop.
   End If
   check Ethernet frame Destination Address (DA)
   DoCase [DA]
   Case: Broadcast
      If Forwarding_Enabled
         forwarding_decision=Forward to CM MAC
         Get exclusive access to CPE_Table
         Search CPE_Table for Ethernet frame SA (Source Address)
         If (Not Found)
            If Number of supported CPE Less Than Max allowed CPE's
               Add CPE's SA to Table as Supported and Learned
            Else (Max number of allowed CPE's reached)
               Add CPE's SA to Table as NOT Supported
            End If
         End If
         Release exclusive access to CPE_Table
      Else (Forwarding not enabled)
         forwarding_decision=Discard
      End If
   Break
   Case: Multicast
      If DA==Bridge Protocol Data Unit BPDU
         forwarding_decision=Discard
      Else
         If Forwarding_Enabled
            forwarding_decision=Forward to CM MAC
            Get exclusive access to CPE_Table
            Search CPE_Table for Ethernet frame SA (Source Address)
            If (Not Found)
               If Number of supported CPE Less Than Max allowed
                  Add CPE's SA to Table as Supported and Learned
               Else (Max number of allowed CPE's reached)
                  Add CPE's SA to Table as NOT Supported
               End If
            End If
            Release exclusive access to CPE_Table
         Else (Forwarding not enabled)
            forwarding_decision=Discard
         End If
      End If
   Break
   Case: Unicast

```
If Forwarding_Enabled
    Get exclusive access to CPE_Table
    Search CPE_Table for Ethernet frame SA (Source
        Address)
    If Found
        If Supported TRUE
            Search CPE_Table for DA (Destination Address)
            If Found
                forwarding_decision=Discard
            Else
                forwarding_decision=Forward to
    CM MAC
            End If
        Else (Not Supported)
            forwarding_decision=Discard
        End If
    Else (Not Found)
        If Number of supported CPE Less Than Max
            allowed CPE's
            Add CPE's SA to Table as Supported and
                Learned
            Search CPE_Table for DA (Destination Address)
            If Found
                forwarding_decision=Discard
            Else
                forwarding_decision=Forward to
    CM MAC
            End If
        Else (Max number of allowed CPE's reached)
            Add CPE's SA to Table as NOT Supported
            forwarding_decision=Discard
        End If
    End If
    Release exclusive access to CPE_Table
Else (Forwarding not enabled)
    forwarding_decision=Discard
End If
End Case
DoCase [forwarding_decision]
Case: Discard
Return Upstream buffer to Upstream Buffer pool.
break
Case: Forward to CM MAC
Send Upstream buffer to DOCSIS driver send API.
Return Upstream buffer to Upstream Buffer pool.
break
End Case
End While
```

5.3.2 Ethernet Controller Receive Interrupts

On ST20-JEI platform, the following two interrupts are also part of the upstream forwarding process 82:
MACE Interrupt (Frame Received)
Receive FIFO Full
The simplified process flows are:
MACE Interrupt (Frame Received):
Send Upstream buffer pointer to Upstream Forwarding message queue.
Get new Upstream buffer from Upstream Forwarding Buffer pool.
Point MACE to start of Ethernet frame in Upstream buffer.
Dismiss Interrupt
Note: Upstream Buffer for the first frame is pre-allocated by the MACE Init routine.

Receive FIFO Full:
Copy 64 bytes (32 16-bit words) to current Upstream Buffer
Dismiss Interrupt On the Explorer platform, a similar process flow is performed in the relevant "case" of the enet0_Thread( ).

5.4 Local Host Receive Task

The local host receive task 70 is activated by the downstream forwarding task 64 through the local host receive task message queue. The simplified process flow is:
```
While (true)
    Wait for Fusion Receive Task Message Queue
    If LLC Header
        Process LLC Command
    Else
        If Fusion message available from Fusion LWQ queue
            Copy Downstream Ethernet frame into Fusion message
            Queue message into Fusion LWQ queue
            Call Fusion receive routine (lwq_recv_task( ))
            Return Downstream Buffer to Downstream buffer
                pool
        Endif
    Endif
End While
```
5.5 Local Host Tranmsit Routine The local host transmit routine is bridge_start( ) at the end of Fusion Transmit calling tree. The simplified process flow is:
```
Get new buffer from the dedicated Fusion Upstream buffer pool
    If Upstream buffer available
    Copy Length from Fusion message to Upstream buffer
    Set Service Type in Upstream buffer (0 for now)
    Copy Ethernet frame from Fusion message to Upstream
        buffer
    Send Upstream buffer to DOCSIS driver send API.
    Return Upstream buffer to Upstream Buffer pool.
    End If
```
5.6 IEEE 802.2 LLC Processing As stated above, the cable modem 50 includes an LLC host 56B. As such, the CM responds appropriately to TEST and XID requests. The XID and TEST requests can be sent over IEEE 802.3 formatted frames only. Incoming frames using that format can be flagged by analyzing the 16-bit field that comes immediately after the Ethernet source address: for DIX framing, this is the "Ethernet Type", whose value is 2048 (0x800) for IP carrying frames, 2056 (0x806) for ARP, etc. If that 16-bit field value is equal or less than 1500, most likely the frame is an IEEE 802.3 (LLC) formatted frame and that 16-bit field is actually the 802.3 "length" field. Downstream frames from the CM MAC 52 whose destination address matches the CM MAC address and with an "Ethernet Type" value less or equal than 1500, will be passed to the LLC host 56B for further processing.

6 Procedural Design 6.1 Downstream Forwarding Procedures 6.1.1 Downstream Forwarding Task Function Prototype:
static void Dwstr_Fwd_Task (void *p); /* Downstream Forwarding */
Task Internal Data Structures:
task_tcb Dwstr_Fwd_Task_TCB; /* Task Control Block */
task_desc Dwstr_Fwd_Task_Desc; /* Task Descriptor */

Inter-Task Communication:
message_queue *Dwstr_Fwd_Queue=&Dwstr_Fwd_Queue_Struct;
/* Downstream Forwarding Message Queue */
Note: message size is 4 bytes (1 pointer).
message_queue Fusion_RX_Queue;
/* Fusion Receive Task message queue */
volatile boolean Ether_TX_Active=false;
/* Ethernet transmission active flag */
osw_mutex_t CPE_Table_Sem; /* CPE Table Access Semaphore */
Local Variables:
Dwstr_hdr *Dwstr_Buffer;/* Downstream DOCSIS frame */
int Dwstr_error; /* Error code returned by CM MAC */
MAC_addr *CPE_Entry; /* CPE Table Entry */
ether_header * Hdr_Ptr; /* pointer to Ethernet header */
enum Eth_Frame_Type Frame_Type; /* Frame type classifier */
enum Fwd_Decision Forwarding; /* Frame Forwarding decision */
message_buffer Dwstr_Msg; /* temporary storage for Dwstr msg. */
message_buffer *Dwstr_Ptr=&Dwstr_Msg; /* message pointer */
Static and Global Variables:
boolean Bridge_Up=false; /* true if bridge interface is up */
boolean Forwarding_Enabled=false; /* true if enabled */
HashTable CPE_Table; /* CPE MAC Address Table */
int Max_Supported_CPE=MAX_CPE;
/* Maximum number of supported CPE set by CM Manager */
int Supported_CPE=0; /* Total number of supported CPE */
int Learned_CPE=0; /* Total number of learned CPE */
Stack_t Dwstr_Pool;
/* Downstream Buffers Pool Control Structure */
static void *Dwstr_Ptr_Stack[MAX_DWSTR];
/* Downstream Buffers Pointers Stack */
static Dwstr_hdr Dwstr_Buff_Array[MAX_DWSTR];
/* Downstream Buffers Array */
Process flow: See Section 5.2.1
Ancillary Functions called:
boolean Compare_MAC_Addr (a48 addr1, a48 addr2);
/* returns true if both MAC addresses are equal */
static boolean Is_MAC_Management(a48 addr);
/* returns true if MAC address is CM MAC Management */
MAC_addr *Search_CPE_Table(a48 addr, HashTable *Table);
/* Search CPE Table for this address */
void Dwstr_Fusion_RX(Dwstr_hdr *Dwstr_Buffer);
/* Copy frame inside DOCSIS buff into Fusion Message */
void Process_LLC_Cmd(Dwstr_hdr *Dwstr_Buffer);
/* Process received LLC command */
void Ether_Start (Dwstr_hdr *Dwstr_Buffer);
/* starts Ethernet transmission offrame inside DOCSIS buff */
6.1.2 Ethernet Transmit Interrupts
The MACE Ethernet controller will generate an interrupt when a frame is received or a frame transmission is complete:
void MaceInterrupt (void);
The MACE flags are checked, if it is a transmit interrupt, the corresponding process flow is executed.

Inter-Task Communication:
volatile boolean Ether_TX_Active=false;
/* Ethernet transmission active flag */
Local Variables:
int xmtStat; /* transmit status */
int intStat;
int retryStat;
int retryCount;
Static and Global Variables:
Stack_t Dwstr_Pool;
/* Downstream Buffers Pool Control Structure */
Process flow: See Section 5.2.2
Ancillary Functions called:
void Ether_Start (Dwstr_hdr *Dwstr_Buffer);
/* starts Ethernet transmission offrame inside DOCSIS buff */
In addition, the MACE Transmit FIFO will generate an interrupt request:
void TDTInterrupt (void);
6.2 Upstream Forwarding Procedures
6.2.1 Upstream Forwarding Task
Function Prototype:
static void Upstr_Fwd_Task (void *p) /* Upstream Forwarding */
Task Internal Data Structures:
task_tcb Upstr_Fwd_Task_TCB; /* Task Control Block */
task_desc Upstr_Fwd_Task_Desc; /* Task Descriptor */
Inter-Task Communication:
message_queue *Upstr_Fwd_Queue=&Upstr_Fwd_Queue_Struct;
/* Upstream Forwarding Message Queue */
osw_mutex_t CPE_Table_Sem; /* CPE Table Access Semaphore */
Upstr_error=docsisdrv_SendPdu( Service_Type, Upstr_Buff→frame, Upstr_Buff→len);
Local Variables:
int Service_Type=0; /* DOCSIS Service Type (0 by default) */
MAC_addr *CPE_Entry; /* CPE Table Entry */
ether_header * Hdr_Ptr; /* pointer to Ethernet header */
enum Eth_Frame_Type Frame_Type; /* Frame type classifier */
enum Fwd_Decision Forwarding; /* Frame Forwarding decision */
Upstr_hdr *Upstr_Buff; /* Upstream message buffer */
message_buffer *Msg_Ptr;
/* Pointer to Upstream message from Upstream Forwarding Queue */
int Upstr_error; /* Error code from DOCSIS driver API */
Static and Global Variables:
boolean Bridge_Up=false; /* true if bridge interface is up */
boolean Forwarding_Enabled=false; /* true if enabled */
HashTable CPE_Table; /* CPE MAC Address Table */
int Max_Supported_CPE=MAX_CPE;
/* Maximum number of supported CPE set by CM Manager */
int Supported_CPE=0; /* Total number of supported CPE */
int Learned_CPE=0; /* Total number of learned CPE */
Stack_t Upstr_Bri_Pool;
/* Upstream Bridging Buffers Pool Control Structure */

```
    static void *Upstr_Bri_Ptr_Stack[MAX_BRI_
UPSTR];
    /* Upstream Bridging Buffers Pointers Stack */
    static Upstr_hdr Upstr_Bri_Buff_Array[MAX_BRI_
UPSTR];
    /* Upstream Bridging Buffers Array */
    Process flow: See Section 5.3.1
    Ancillary Functions called:
    boolean Compare_MAC_Addr (a48 addr1, a48 addr2);
    /* returns true if both MAC addresses are equal */
    static boolean Is_BPDU (a48 addr);
    /* returns true if MAC address is Bridge Protocol Data
Unit */
    MAC_addr *Search_CPE_Table(a48 addr, HashTable
*Table);
    /* Search CPE Table for this address */
    static void Learn_CPE (a48 addr);
    /* Learn this CPE if allowed */
    int Add_CPE_Table(a48 addr,
    u8 Supported,
    u8 Provisioned,
    HashTable *Table);
    /*Add a CPE to the CPE MAC Address Table */
6.2.2 Ethernet Receive Interrupts
    The MACE Ethernet controller will generate an interrupt
when a frame is received or a frame transmission is complete:
    void MaceInterrupt (void);
Note this is the same interrupt routine for reception and for
end of transmission. The MACE flags are checked, if it is a
receive interrupt, the corresponding process flow is
executed.
    Inter-Task Communication:
    message_queue *Upstr_Fwd_Queue=&Upstr_Fwd_
Queue_Struct;
    /* Upstream Forwarding Message Queue */
    Local Variables:
    int rcvStat; /* receive status */
    int len; /* received frame length */
    int dummy; /* temporary H/W register copy */
    Upstr_hdr *Upstr_Buff; /* Upstream message buffer */
    Static and Global Variables:
    static volatile boolean discardThisPacket;
    /* Discard Ethernet frames flag */
    static char discardBuffer[2048];
    /* "trash" buffer for discarded frames */
    static MACE_PRAM *dv;
    /* pointer to MACE Ethernet Controller H/W registers */
    static volatile char *maceRecvBuffer;
    /* Buffer MACE Ethernet Controller is receiving into */
    static volatile int maceRecvLen=0;
    /* Received bytes counter */
    Process flow: See Section 5.3.2
    Ancillary Functions called: None.
    In addition, the MACE Receive FIFO will generate an
interrupt request:
    void RDTInterrupt (void);
6.3 Local Host Receive Task
    This task actually starts Fusion message state machine
upon reception of a frame from the downstream forwarding
task 64.
    Function Prototype:
    static void Fusion_RX_Task (void *p); /* Fusion
Receive Task */
    Task Internal Data Structures:
    task_tcb Fusion_RX_Task_TCB; /* Task Control
Block */
    task_desc Fusion_RX_Task_Desc; /* Task Descriptor
*/
    Inter-Task Communication:
    message_queue Fusion_RX_Queue;
    /* Fusion Receive Task message queue */
    Local Variables: None.
    Static Variables: None.
    Process flow: See Section 5.4
6.4 Fusion Bridge Device Procedures
    These procedures are part of the bridge 58 as seen from
the Fusion protocol stack: see Fusion Porting Guide and
section 4.2.2.
6.4.1 Bridge Transmission Start Procedure
    Function Prototype:
    int bridge_start(m * mp);
    Inter-Task Communication:
    Upstr_error=docsisdrv_SendPdu(Service_Type,
    Upstr_Buff→frame,
    Upstr_Buff→len);
    Static and Global Variables:
    static Stack_t Upstr_CM_Pool;
    /* Upstream Fusion Buffers Pool Control Structure */
    Local Variables:
    int Service_Type=0; /* DOCSIS Service Type (0 by
default) */
    Upstr_hdr *Upstr_Buff; /* Upstream message buffer */
    Process flow: See Section 5.5
6.4.2 Bridge Initialization Procedure
    Function Prototype:
    int bridge_init(netdev * ndp);
    Static and Global Variables:
    Process flow:
    Initialize Fusion data structure (local_fns_data[ ]) with
CM MAC address.
    Initialize and Start Fusion Receive Task
    Initialize Ethernet controller (Tx and Rx are disabled).
    Initialize and Start Downstream Forwarding Task.
    Initialize and Start Upstream Forwarding Task.
6.4.3 Bridge Up/Down Procedure
    Function Prototype:
    int bridge_updown(netdev * ndp, u16flags, char *
options);
    Static and Global Variables:
    boolean Bridge_Up=false; /* true if bridge interface is up
*/
    Process flow:
    If flags value is: Up (true)
    Initialize Link Layer structure of Fusion Network Device
Data Structure.
    Enable Ethernet Controller frame reception and Interrupts.
    Allocate buffer pool from Fusion LWQ heap.
    Enable Data transfer between CM MAC and CM IP host
(Fusion).
    Else (flags value is: Down (false))
    Release Fusion LWQ buffer pool.
    Disable Ethernet Controller frame reception and Interrupts.
    Disable Data transfer between CM MAC and CM IP host
(Fusion).
    Disable Data forwarding between CM MAC and CPE
Ethernet port.
    End If
6.4.4 Bridge Input/Output Control
    Function Prototype:
    int bridge_ioctl(netdev * ndp, int cmnd, char * addr);
```

Static and Global Variables:
Process flow:
DoCase [cmnd]
Case ENIOCNORMAL:
Return Code: No Error
break
default:
Return Code: Not Supported
EndCase Note: This function is implemented for compatibility with Fusion Network Device interface only; it does not perform any action regarding the operation of the bridge 58.

7 DOCSIS Bridge File Structure 7.1 Implementation Files

The DOCSIS Bridge implementation code will be in the following files:

1. bridgecm.c (Downstream and Upstream Forwarding)
Dwstr_Fwd_Task( ) /* Downstream Forwarding Task */
Upstr_Fwd_Proc( ) /* Upstream Forwarding Task */
Compare_MAC_Addr( ) /* Compares 2 MAC addresses */
Is_MAC_Management( ) /* check if frame is MAC Management */
Is_BPDU ( ) /* check if Bridge Protocol Data Unit */
Learn_CPE( ) /* Learn a CPE (if allowed) */
Init_Bridge_Buffers( ) /* Init Bridge Buffer pools */
Init_Bridge_Queues( ) /* Init Bridge message queues */
Start_Bridge( ) /* Bridge Startup routine */

2. mace_bri.c (MACE Ethernet Controller Interface: on the JEI platform only)
MaceInterrupt( ) /* MACE controller interrupt handler */
TDTInterrupt( ) /* Tx FIFO interrupt handler */
RDTInterrupt( ) /* Rx FIFO interrupt handler */
Ether_Init( ) /* Ethernet controller H/W init routine */
Ether_UpDown( ) /* Ethernet controller enable routine */
Ether_Start( ) /* Ethernet controller transmit routine */
Ether_IoCtl( ) /* Ethernet controller control routine */
EnableEtherInterrupts( ) /* MACE interrupts enable */
DisableEtherInterrupts( ) /* MACE interrupts disable */
InstallInterrupts( ) /* MACE interrupts setup */

3. enet_bri.c (CS8900 Ethernet Controller Interface: Explorer platform only)
Ether_Init( ) /* Ethernet controller H/W init routine */
Ether_UpDown( ) /* Ethernet controller enable routine */
Ether_Start( ) /* Ethernet controller transmit routine */
Ether_IoCtl( ) /* Ethernet controller control routine */
enet0_Thread( ) /* Interrupt processing thread */

4. bridgedv.c (DOCSIS Bridge Fusion Network Device Interface)
bridge_init( ) /* Fusion Network Device Init */
bridge_updown( ) /* Fusion Network Device Rx/Tx enable */
bridge_start( ) /* Fusion Network Device transmit start */
bridge_ioctl( ) /* Fusion Network Device Control */
Fusion_RX_Task( ) /* Fusion IP Protocol Stack receive task */
Dwstr_Fusion_Rx( )/* Fusion Downstream Receive routine */
Init_Upstr_Fusion_Buffers /* Init Fusion Buffers pool */

5. mncs_llc.c (802.2 LLC processing code)
Process_LLC_Cmd( ) /* Process received 802.2 LLC command */

6. cpe_table.c (CPE MAC Address Table processing)
Init_CPE_Table( ) /* Initialize CPE Table Data Structures */
Search_CPE_Table( ) /* Search CPE Table for a MAC address */
Add_CPE_Table( ) /* Add a CPE to CPE MAC Address Table */
Remove_Learned_CPE( ) /* Remove learned CPE from CPE Table */

7. bridge_if.c (Bridge Interface with Cable Modem Manager)
br_bridge_init( ) /* Initialize Bridge data structures */
br_bridge_set( ) /* Set Bridge parameter to desired value */
br_provision_CPE( ) /* Provision a CPE MAC address */

8. buffers.c (Stack based Memory Objects Management)
Init_Stack( ) /* Initialize Stack control structures */
Get_Object( ) /* Get new object from stack */
Return_Object( ) /* Return an object back to stack */

7.2 Header Files

The header files allow the bridge implementation code to share data structures and function prototypes. The file bridgedv.c includes all of the Fusion headers plus some specific headers for interface with the bridge 58. The CM MAC software will also share some header files with the bridge software.

bridge.h DOCSIS Bridge private headers
Included by:
bridgecm.c
mace_bri.c (JEI platform)
enet_bri.c (Explorer platform)
bridge_if.c bridgecm.h DOCSIS Bridge Interface headers
Included by:
bridgecm.c
mace_bri.c (JEI platform)
enet_bri.c (Explorer platform)
bridgedv.c
bridge_if.c
CM MAC Software mcns_if.h DOCSIS Bridge/MAC Interface headers
Included by:
bridgecm.c
CM MAC Software Fusioncm.h DOCSIS Bridge/Fusion Interface headers
Included by:
bridgecm.c
bridgedv.c ether_bri.h DOCSIS Bridge/Ethernet Controller Interface headers
Included by:
bridgecm.c
mace_bri.c (JEI platform)
enet_bri.c (Explorer platform)

ether_if.h Function Prototypes for Ethernet Control Routines
Included by:
mace_bri.c (JEI platform)
enet_bri.c (Explorer platform)
bridgedv.c mcns_llc.h 802.2 LLC Interface headers
Included by:
mcns_llc.c
bridgecm.c hash.h Hash Table headers
Included by:
bridgecm.c
cpe_table.c
bridge_if.c bridge_if.h Bridge and CM Manager Interface Headers
Included by:
bridgecm.c
cpe_table.c
bridge_if.c The above description of illustrated embodiments is not intended to be exhaustive or to limit the invention to the precise forms disclosed. Accordingly, the invention is not limited by the disclosure, but instead the scope of the invention is to be determined entirely by the following claims, which are to be construed in accordance with established doctrines of claim interpretation.

What is claimed is:

1. A cable modem, comprising:
   a host for receiving messages directed to the cable modem;
   a first set of memory buffers for storing messages;
   a media access controller (MAC) structured to receive a first message from a cable network and store the first message in a first memory buffer of the first set;
   a downstream forwarding task structured to determine whether the first message is directed to the host;
   a second set of memory buffers;
   a second host receive task structured to copy the first message into a second memory buffer of the second set, release the first memory buffer for re-use by the MAC, and pass control of the first message to the second host for processing using the second memory buffer.

2. The cable modem of claim 1, further comprising:
   a CPE interface structured to receive a second message from a CPE and store the second message in an interface buffer; and
   an upstream forwarding task structured to determine whether the second message is directed to the MAC and forward the second message to the MAC, wherein the MAC is structured to forward the second message to the cable network and release the interface buffer for subsequent use by the CPE interface.

3. The cable modem of claim 2 wherein the CPE interface is an Ethernet interface that receives Ethernet frames from the CPE.

4. The cable modem of claim 2, further comprising:
   a local host transmit task structured to receive a third message from the host and forward the third message to the MAC, wherein the MAC is structured to forward the third message to the cable network.

5. The cable modem of claim 4, further comprising an upstream MAC queue structure to receive the second and third messages, wherein the MAC transmits the messages in sequential order from the upstream MAC queue to the cable network.

6. The cable modem of claim 1, further comprising:
   a CPE interface structured to receive a second message from a CPE and store the second message in an interface buffer; and
   a local host receive task structured to determine whether the second message is directed to the host and forward the second message to the host, wherein the host is structured to process the second message and release the interface buffer for subsequent use by the CPE interface.

7. A cable modem, comprising:
   a host for receiving messages directed to the cable modem, the host being associated with a unique network address;
   a media access controller (MAC) structured to provide an interface between a cable network and the cable modem;
   a customer premises equipment (CPE) interface structured to provide an interface between one or more CPEs and the cable modem;
   a bridge connected between the host, MAC, and CPE interface and structured to transmit messages from the MAC and CPE interface to the host and from the host to the MAC and CPE interface.

8. The cable modem of claim 7 wherein the bridge includes:
   a first set of memory buffers for storing messages, wherein the MAC is structured to receive a first message from the cable network and store the first message in a first memory buffer of the first set; and
   a downstream forwarding task structured to forward the first message to either the host or the CPE interface in response to determining whether the first message is directed to the host or to the one or more CPEs.

9. The cable modem of claim 8 wherein the bridge further includes a host receive task structured to copy the first message into a second memory buffer, release the first memory buffer for re-use by the MAC, and pass control of the first message to the host for processing using the second memory buffer.

10. The cable modem of claim 7 wherein the CPE interface is structured to receive a message from the one or more CPEs and store the second message in an interface buffer; the bridge includes an upstream forwarding task structured to determine whether the message is directed to the MAC and forward the second message to the MAC; and the MAC is structured to forward the message to the cable network and release the interface buffer for subsequent use by the CPE interface.

11. The cable modem of claim 7 wherein the CPE interface is an Ethernet interface that receives Ethernet frames from, and transmits Ethernet frames to, the one or more CPEs.

12. The cable modem of claim 7, wherein the bridge further includes a local host transmit task structured to receive a first message from the host and forward the first message to the MAC, wherein the MAC is structured to forward the first message to the cable network.

13. The cable modem of claim 12, wherein the CPE interface is structured to receive a second message from the one or more CPEs and store the second message in an interface buffer, wherein the bridge includes:
   an upstream MAC queue structure, wherein the local host transmit task is structured to store the first message in the upstream MAC queue structure; and
   an upstream forwarding task structured to determine whether the second message is directed to the MAC and place the second message in the upstream MAC queue structure, wherein the MAC is structured to transmit the messages in sequential order from the upstream MAC queue to the cable network and release the interface buffer for subsequent use by the CPE interface.

14. The cable modem of claim 7 where the CPE interface is structured to receive a message from the one or more CPEs and store the message in an interface buffer; and the bridge further includes:
   a local host receive task structured to determine whether the message is directed to the host and forward the message to the host, wherein the host is structured to process the message and release the interface buffer for subsequent use by the CPE interface.

15. A method of interfacing a cable network with a customer premises equipment (CPE) using a cable modem, the method comprising:

receiving a first message from the cable network;

storing the first message in the cable modem;

determining whether the first message is directed to the CPE or a host of the cable modem, the host having a unique network address;

forwarding the first message to the host and processing the first message in the host in response to determining that the first message is directed to the host;

forwarding the first message to the CPE in response to determining that the first message is directed to the CPE;

receiving a second message from the CPE;

storing the second message in the cable modem;

determining that the second message is directed to the host of the cable modem; and forwarding the second message to the host and processing the second message in the host in response to determining that the second message is directed to the host.

16. The method of claim 15, further comprising:

placing a third message from the host in an upstream queue;

receiving a fourth message from the CPE;

placing the fourth message in the upstream queue; and transmitting the third and fourth messages in sequential order from the upstream queue to the cable network.

* * * * *